(12) United States Patent
Desai

(10) Patent No.: US 11,190,401 B2
(45) Date of Patent: *Nov. 30, 2021

(54) IMPARTIAL BUFFERING IN STREAM PROCESSING

(71) Applicant: VMware Inc., Palo Alto, CA (US)

(72) Inventor: Deep P. Desai, Sammamish, WA (US)

(73) Assignee: VMware Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,048

(22) Filed: Oct. 19, 2020

(65) Prior Publication Data

US 2021/0051066 A1 Feb. 18, 2021

Related U.S. Application Data

(63) Continuation of application No. 15/908,693, filed on Feb. 28, 2018, now Pat. No. 10,812,332.

(51) Int. Cl.
*H04L 12/24* (2006.01)
*H04L 29/06* (2006.01)
*H04L 12/861* (2013.01)
*H04L 12/26* (2006.01)

(52) U.S. Cl.
CPC ...... *H04L 41/0823* (2013.01); *H04L 41/0843* (2013.01); *H04L 41/0896* (2013.01); *H04L 43/0894* (2013.01); *H04L 49/90* (2013.01); *H04L 65/4069* (2013.01)

(58) Field of Classification Search
CPC ............ H04L 41/0823; H04L 41/0843; H04L 41/0896; H04L 41/0893; H04L 41/0803; H04L 41/08; H04L 43/0894; H04L 49/90; H04L 65/4069

USPC .......................................................... 709/220
See application file for complete search history.

(56) References Cited

U.S. PATENT DOCUMENTS

| | | | |
|---|---|---|---|
| 5,060,150 A | 10/1991 | Simor | |
| 5,206,933 A * | 4/1993 | Farrell | .............. H04L 29/06 370/463 |
| 6,970,865 B1 | 11/2005 | Plasek et al. | |
| 7,215,970 B2 | 5/2007 | Corrigan et al. | |
| 7,444,679 B2 | 10/2008 | Tarquini et al. | |
| 7,953,571 B2 | 5/2011 | Odaka et al. | |
| 8,145,669 B2 | 3/2012 | Cormode et al. | |
| 8,291,490 B1 * | 10/2012 | Ahmed | ............. G06F 21/604 726/17 |
| 8,375,060 B2 | 2/2013 | Dewar et al. | |
| 8,498,996 B2 | 7/2013 | Whitcher et al. | |
| 8,738,608 B2 | 5/2014 | Pauly | |

(Continued)

OTHER PUBLICATIONS

Final Office Action received for U.S. Appl. No. 15/881,376, dated Aug. 14, 2020, 12 pages.

(Continued)

*Primary Examiner* — Ruolei Zong
(74) *Attorney, Agent, or Firm* — Dentons US LLP

(57) ABSTRACT

Techniques for generating a stream processing pipeline are provided. In one embodiment, a method includes generating a plurality of pipeline stages of a stream processing pipeline in accordance with a configuration file. The plurality of pipeline stages includes a first processing stage designated for a first data service and a second processing stage designated for a second data service and operating in parallel to the first processing stage.

20 Claims, 15 Drawing Sheets

(56) References Cited

U.S. PATENT DOCUMENTS

| | | | |
|---|---|---|---|
| 8,768,962 B2 | 7/2014 | Laron | |
| 8,949,224 B2 | 2/2015 | Gupta | |
| 9,047,558 B2 | 6/2015 | Hochstein | |
| 9,418,101 B2 | 8/2016 | He et al. | |
| 9,437,022 B2 | 9/2016 | Vander Broek | |
| 9,514,183 B1 | 12/2016 | Alla | |
| 9,582,500 B2 | 2/2017 | Mcgillin et al. | |
| 9,712,887 B2 | 7/2017 | Myers et al. | |
| 9,717,011 B2 | 7/2017 | Huang et al. | |
| 9,817,851 B2 | 11/2017 | Dumant et al. | |
| 9,892,237 B2 | 2/2018 | Greenfield | |
| 9,898,334 B1* | 2/2018 | Dongare | G06F 9/4881 |
| 10,044,578 B2 | 8/2018 | He et al. | |
| 10,073,903 B1 | 9/2018 | Arye et al. | |
| 10,242,061 B2 | 3/2019 | Luo et al. | |
| 10,346,337 B1* | 7/2019 | Johnson | G06F 13/423 |
| 10,445,334 B1 | 10/2019 | Xiao et al. | |
| 10,445,479 B2 | 10/2019 | Rao et al. | |
| 10,460,277 B2 | 10/2019 | Dumant et al. | |
| 10,496,653 B1* | 12/2019 | Epshteyn | G06F 16/2457 |
| 2002/0152254 A1 | 10/2002 | Teng | |
| 2004/0002956 A1 | 1/2004 | Chaudhuri et al. | |
| 2004/0215644 A1 | 10/2004 | Edwards et al. | |
| 2005/0114505 A1 | 5/2005 | Destefano et al. | |
| 2005/0120062 A1 | 6/2005 | Sinha et al. | |
| 2007/0061291 A1 | 3/2007 | Azizi | |
| 2007/0078827 A1 | 4/2007 | Sareen et al. | |
| 2008/0010268 A1 | 1/2008 | Liao et al. | |
| 2011/0153953 A1 | 6/2011 | Khemani et al. | |
| 2012/0060165 A1* | 3/2012 | Clarke | G06F 11/3051 718/104 |
| 2012/0207046 A1 | 8/2012 | Di et al. | |
| 2013/0227573 A1 | 8/2013 | Morsi et al. | |
| 2014/0068578 A1 | 3/2014 | Gedik et al. | |
| 2014/0109097 A1 | 4/2014 | Datla et al. | |
| 2014/0143505 A1 | 5/2014 | Sim et al. | |
| 2014/0172867 A1 | 6/2014 | Lin et al. | |
| 2015/0040121 A1* | 2/2015 | Barabash | H04L 41/5003 718/1 |
| 2015/0095097 A1 | 4/2015 | Dejardine et al. | |
| 2015/0186434 A1 | 7/2015 | Eichinger et al. | |
| 2015/0286661 A1 | 10/2015 | Deluca et al. | |
| 2016/0162543 A1 | 6/2016 | Gustafson et al. | |
| 2016/0164746 A1* | 6/2016 | Cimprich | G06F 9/5077 709/220 |
| 2016/0179063 A1* | 6/2016 | De Baynast De Septfontaines | H04L 41/0853 700/11 |
| 2016/0196324 A1* | 7/2016 | Haviv | G06F 3/0649 707/626 |
| 2016/0358084 A1 | 12/2016 | Bloomquist et al. | |
| 2017/0004006 A1 | 1/2017 | Mori et al. | |
| 2017/0068727 A1 | 3/2017 | Rubin et al. | |
| 2017/0177263 A1* | 6/2017 | Das | G06F 3/0635 |
| 2018/0103081 A1 | 4/2018 | Fawcett | |
| 2018/0137169 A1 | 5/2018 | Zhao | |
| 2018/0181632 A1 | 6/2018 | Zarum et al. | |
| 2018/0196824 A1 | 7/2018 | Bitincka et al. | |
| 2018/0270164 A1 | 9/2018 | Ahmed et al. | |
| 2018/0278500 A1 | 9/2018 | Feamster et al. | |
| 2018/0293275 A1 | 10/2018 | P et al. | |
| 2018/0329644 A1* | 11/2018 | Das | G06F 3/0604 |
| 2019/0073373 A1 | 3/2019 | Surale et al. | |
| 2019/0155850 A1 | 5/2019 | Shi et al. | |
| 2019/0226898 A1 | 7/2019 | Gray, Jr. | |
| 2019/0236182 A1 | 8/2019 | Tiyyagura et al. | |
| 2019/0236183 A1 | 8/2019 | Tiyyagura et al. | |
| 2019/0236185 A1 | 8/2019 | Tiyyagura et al. | |
| 2019/0236197 A1 | 8/2019 | Karlapudi et al. | |
| 2019/0266273 A1 | 8/2019 | Karlapudi et al. | |
| 2019/0268272 A1 | 8/2019 | Desai | |
| 2019/0268401 A1 | 8/2019 | Desai et al. | |
| 2019/0286719 A1 | 9/2019 | Morales et al. | |
| 2020/0167361 A1 | 5/2020 | Princehouse et al. | |

OTHER PUBLICATIONS

Final Office Action received for U.S. Appl. No. 15/881,382, dated Aug. 18, 2020, 13 pages.
Final Office Action received for U.S. Appl. No. 15/881,396, dated Sep. 15, 2020, 13 pages.
Final Office Action received for U.S. Appl. No. 15/908,690, dated Jun. 16, 2020, 19 pages.
Non-Final Office Action received for U.S. Appl. No. 15/925,464, dated Apr. 28, 2020, 9 pages.
Notice of Allowance received for U.S. Appl. No. 15/881,364, dated Aug. 4, 2020, 10 pages.
Notice of Allowance received for U.S. Appl. No. 15/908,480, dated Jul. 8, 2020, 10 pages.
Notice of Allowance received for U.S. Appl. No. 15/925,464, dated Nov. 23, 2020, 10 pages.
U.S. Unpublished U.S. Appl. No. 17/087,492, filed Nov. 2, 2020, titled "Efficient Time-Range Queries on Databases In Distributed Computing Systems".
Non-Final Office Action received for U.S. Appl. No. 15/881,364, dated Dec. 26, 2019, 15 pages.
Non-Final Office Action received for U.S. Appl. No. 15/881,376, dated Mar. 26, 2020, 13 pages.
Non-Final Office Action received for U.S. Appl. No. 15/881,382, dated Mar. 26, 2020, 13 pages.
Non-Final Office Action received for U.S. Appl. No. 15/881,396, dated Feb. 13, 2020, 13 pages.
Non-Final Office Action received for U.S. Appl. No. 15/908,480, dated Dec. 4, 2019, 13 pages.
Non-Final Office Action received for U.S. Appl. No. 15/908,690, dated Oct. 22, 2019, 15 pages.
Non-Final Office Action received for U.S. Appl. No. 15/908,693, dated Dec. 10, 2019, 25 pages.
Notice of Allowance received for U.S. Appl. No. 15/908,693, dated Jun. 12, 2020, 7 pages.

* cited by examiner

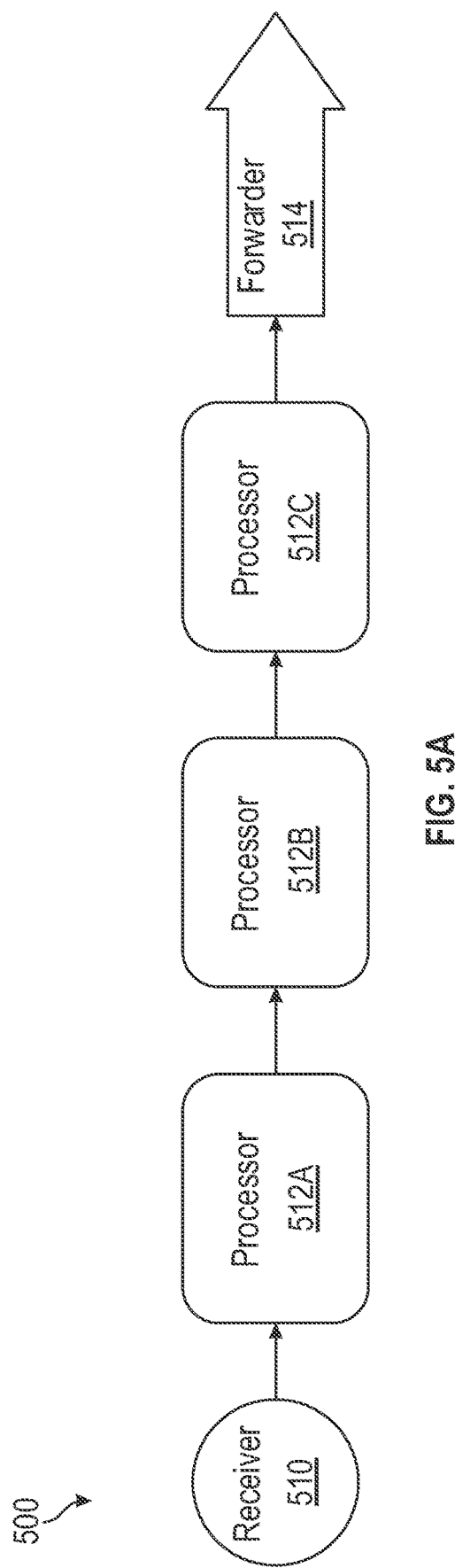

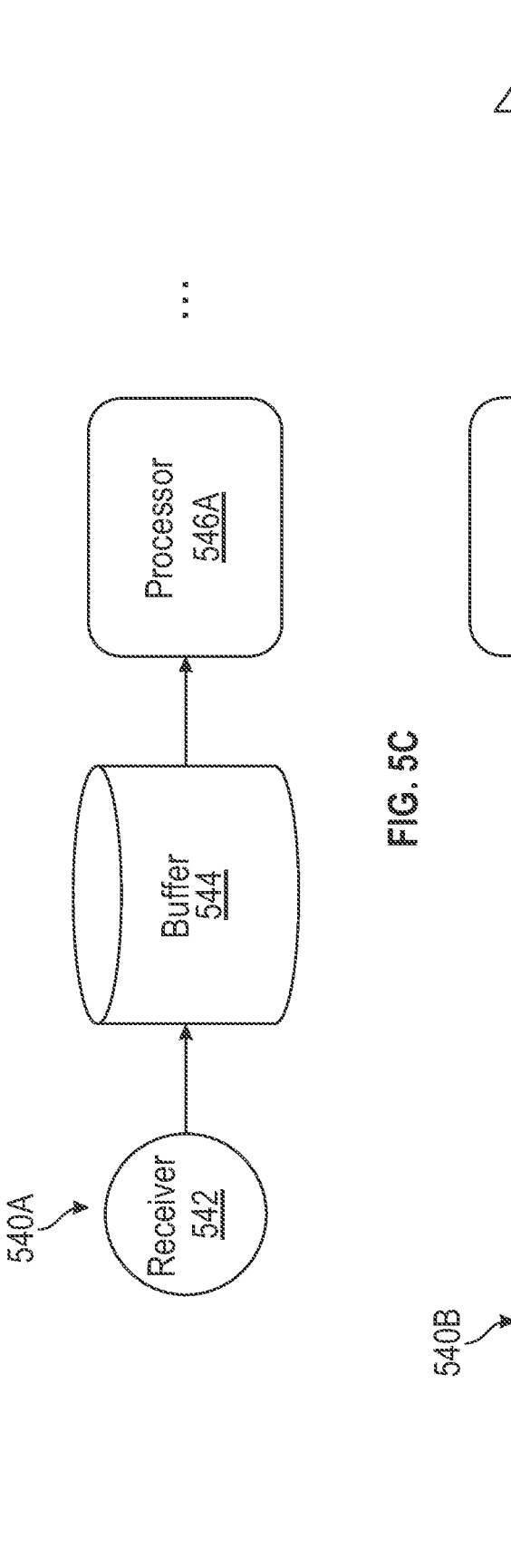
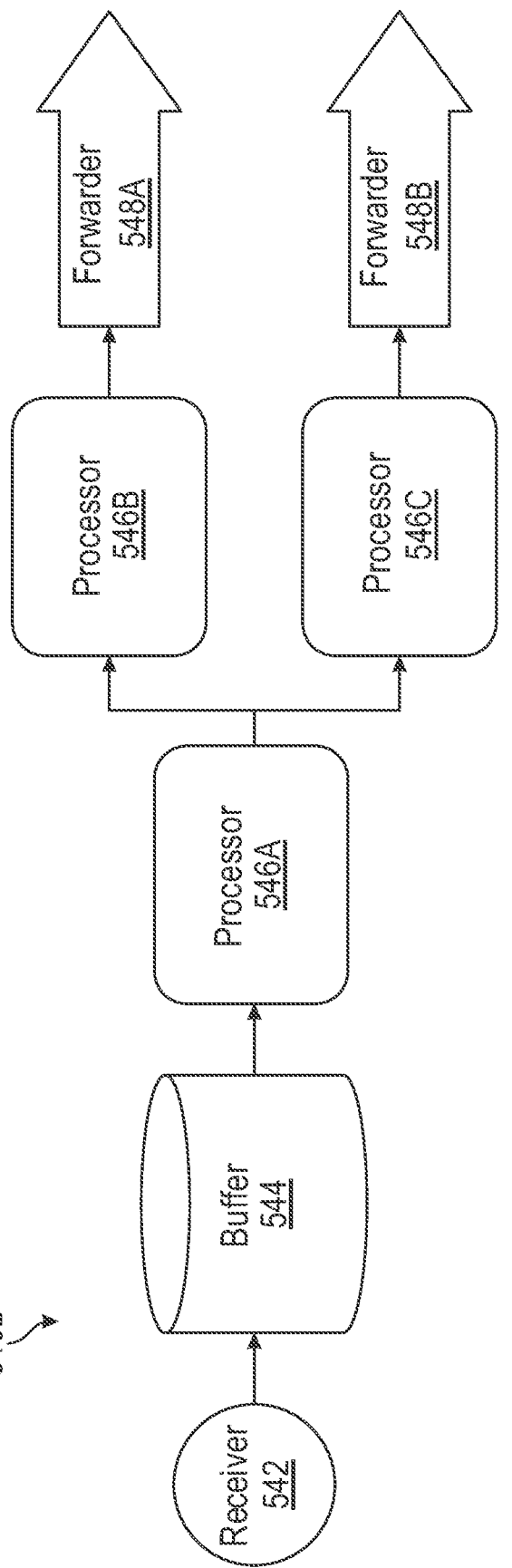
FIG. 5C
FIG. 5D

IMPARTIAL BUFFERING IN STREAM PROCESSING

CROSS-REFERENCE TO RELATED APPLICATIONS

This application is a continuation of U.S. patent application Ser. No. 15/908,693, entitled "IMPARTIAL BUFFERING IN STREAM PROCESSING", filed Feb. 28, 2018, the contents of which is hereby incorporated by reference in its entirety.

FIELD

The present disclosure relates generally to stream processing, and more specifically to generating stream processing pipeline based on a customizable configuration file.

BACKGROUND

Modern distributed-computing systems are increasingly complex and can include thousands of host computing devices, virtual machines (VMs) and networking components, servicing an even larger number of customers. Components of these systems produce massive volumes of machine-generated log data (application logs, network traces, configuration files, messages, performance data, system state dumps, etc.). Log data provide valuable information to system administrators as they manage these complex systems. Log data can be useful in troubleshooting, discovering trends, detecting security problems, and measuring performance.

In practice, unstructured and structured log data are collected and processed at a data collector (e.g., an agent collector operating at a customer's site) from multiple data sources. The data sources may be associated with one or more tenant systems operating at a customer's site. The processed log data can be forwarded to a data service. Stream processing pipelines are typically used at data collectors and ingestion pipelines to collect and/or process data. Traditional stream processing pipelines are often inflexible and difficult to configure based on data properties, different tenant systems, and/or user requirements. Moreover, traditional buffering techniques in stream processing pipelines may cause data transmission bottlenecks.

Overview

As discussed in more detail below, traditional buffering techniques using a single buffer stage may cause a data transmission bottleneck because the different data services may be associated with communication links that have different bandwidth capability for transmitting data items. Described herein are techniques for transmitting of data items to a plurality of data services. In one embodiment, a method includes, at a data collector associated with a tenant system collecting data for ingesting to a distributed-computing system, generating a plurality of pipeline stages of a stream processing pipeline in accordance with a configuration file. The plurality of pipeline stages includes a first buffer stage designated for a first data service and a second buffer stage designated for a second data service. The first data service and the second data service are different data services. The method further includes collecting, at one or more pipeline stages of a first-type in the stream processing pipeline, data items from one or more data sources; processing the collected data items at one or more pipeline stages of a second-type in the stream processing pipeline; and storing at least a portion of the processed data items in the first buffer stage and at least a portion of the processed data items in the second buffer stage. The method further includes transmitting, at one or more pipeline stages of a third-type in the stream processing pipeline, the data items stored in the first buffer stage to the first data service at a first transmission rate; and transmitting the data items stored in the second buffer stage to the second data service at a second transmission rate, the second transmission rate being different from the first transmission rate.

In one embodiment, a non-transitory computer-readable storage medium storing one or more programs configured to be executed by one or more processors is provided. The one or more programs stored by the non-transitory computer-readable storage medium include instructions for, at a data collector of a tenant system collecting data for ingesting to a distributed-computing system, generating a plurality of pipeline stages of a stream processing pipeline in accordance with a configuration file. The plurality of pipeline stages includes a first buffer stage designated for a first data service and a second buffer stage designated for a second data service. The first data service and the second data service are different data services. The one or more programs include further instructions for collecting, at one or more pipeline stages of a first-type in the stream processing pipeline, data items from one or more data sources; processing the collected data items at one or more pipeline stages of a second-type in the stream processing pipeline; and storing at least a portion of the processed data items in the first buffer stage and at least a portion of the processed data items in the second buffer stage. The one or more programs include further instructions for transmitting, at one or more pipeline stages of a third-type in the stream processing pipeline, the data items stored in the first buffer stage to the first data service at a first transmission rate; and transmitting the data items stored in the second buffer stage to the second data service at a second transmission rate, the second transmission rate being different from the first transmission rate.

In one embodiment, a system for generating a stream processing pipeline includes one or more processors and memory storing one or more programs configured to be executed by the one or more processors. The one or more programs include instructions for, at a data collector of a tenant system collecting data for ingesting to a distributed-computing system, generating a plurality of pipeline stages of a stream processing pipeline in accordance with a configuration file. The plurality of pipeline stages includes a first buffer stage designated for a first data service and a second buffer stage designated for a second data service. The first data service and the second data service are different data services. The one or more programs include further instructions for collecting, at one or more pipeline stages of a first-type in the stream processing pipeline, data items from one or more data sources; processing the collected data items at one or more pipeline stages of a second-type in the stream processing pipeline; and storing at least a portion of the processed data items in the first buffer stage and at least a portion of the processed data items in the second buffer stage. The one or more programs include further instructions for transmitting, at one or more pipeline stages of a third-type in the stream processing pipeline, the data items stored in the first buffer stage to the first data service at a first transmission rate; and transmitting the data items stored in the second buffer stage to the second data service at a second transmission rate, the second transmission rate being different from the first transmission rate.

In one embodiment, a method for collecting data items from a plurality of tenant systems includes, at a data collector associated with a plurality of tenant systems collecting data for ingesting to a distributed-computing system, generating a plurality of pipeline stages of a stream processing pipelines in accordance with a configuration file. The plurality of pipeline stages includes a first buffer stage and a second buffer stage. The method further includes collecting, at one or more pipeline stages of a first-type in the stream processing pipeline, data items from a first tenant system and a second tenant system; storing data items collected from the first tenant system in the first buffer stage; storing data items collected from the second tenant system in the second buffer stage; processing the stored data items at one or more pipeline stages of a second-type in the stream processing pipeline; and transmitting, at one or more pipeline stages of a third-type in the stream processing pipeline, the processed data items to a data service.

In one embodiment, a non-transitory computer-readable storage medium storing one or more programs configured to be executed by one or more processors is provided. The one or more programs stored by the non-transitory computer-readable storage medium include instructions for, at a data collector associated with a plurality of tenant systems collecting data for ingesting to a distributed-computing system, generating a plurality of pipeline stages of a stream processing pipelines in accordance with a configuration file. The plurality of pipeline stages includes a first buffer stage and a second buffer stage. The one or more programs further include instructions for collecting, at one or more pipeline stages of a first-type in the stream processing pipeline, data items from a first tenant system and a second tenant system; storing data items collected from the first tenant system in the first buffer stage; storing data items collected from the second tenant system in the second buffer stage; processing the stored data items at one or more pipeline stages of a second-type in the stream processing pipeline; and transmitting, at one or more pipeline stages of a third-type in the stream processing pipeline, the processed data items to a data service.

In one embodiment, a system for collecting data items from a plurality of tenant systems includes one or more processors and memory storing one or more programs configured to be executed by the one or more processors. The one or more programs include instructions for, at a data collector associated with a plurality of tenant systems collecting data for ingesting to a distributed-computing system, generating a plurality of pipeline stages of a stream processing pipelines in accordance with a configuration file. The plurality of pipeline stages includes a first buffer stage and a second buffer stage. The one or more programs further include instructions for collecting, at one or more pipeline stages of a first-type in the stream processing pipeline, data items from a first tenant system and a second tenant system; storing data items collected from the first tenant system in the first buffer stage; storing data items collected from the second tenant system in the second buffer stage; processing the stored data items at one or more pipeline stages of a second-type in the stream processing pipeline; and transmitting, at one or more pipeline stages of a third-type in the stream processing pipeline, the processed data items to a data service.

BRIEF DESCRIPTION OF THE DRAWINGS

FIG. 5A is a block diagram illustrating an exemplary stream processing pipeline customized to have a serial interconnection of one or more pipeline stages, in accordance with some embodiments.

FIGS. 5C-5D are block diagrams illustrating exemplary stream processing pipelines customized to have a buffer stage following a receiver stage, in accordance with some embodiments.

DETAILED DESCRIPTION

In the following description of embodiments, reference is made to the accompanying drawings in which are shown by way of illustration specific embodiments that can be practiced. It is to be understood that other embodiments can be used and structural changes can be made without departing from the scope of the various embodiments.

As described above, traditional stream processing pipelines are often rigid and difficult to configure based on data properties, different tenant systems, and/or user requirements. This is partially due to the fact that these stream processing pipelines use fixed types of pipeline stages (e.g., receiver, processor) that are not or are less customizable. The techniques described in this application allows different types of pipeline stages to be generated based on customization of a common entity. The common entity has a set of properties that are non-customizable (e.g., common across all types of pipeline stages) and another set of properties that are customizable (e.g. different for different types of pipeline stages). Customization of the entity can be performed to generate any type of pipeline stage. As a result, highly flexible customization is achieved.

Moreover, the techniques described in this application enable customization of the stream processing pipeline to be performed based on analysis of data properties of a specific tenant system. For example, a first tenant system may frequently generate a large quantity of log data in a short period of time, while a second tenant system may rarely generate a large quantity of log data. The stream processing pipeline of the first tenant system can thus be customized differently (e.g., include more processor stages in parallel) from the stream processing pipeline of the second tenant system. As another example, stream processing pipeline can also be customized based on the type of data items generated by a specific tenant system. Accordingly, the techniques described in this application improve the performance of stream processing pipeline by enabling a high degree of customization.

Furthermore, the techniques described in this application also reduce or eliminate data transmission bottlenecks. In particular, a typical stream processing pipeline may include a single buffer stage for storing data items to be transmitted to multiple data services. Using a single buffer stage, however, may cause a data transmission bottleneck because the different data services may be associated with communication links that have different bandwidth capability for transmitting data items. As a result, the rate of transmission to different data services is limited by the slowest communication link. The techniques described in this application customizes a stream processing pipeline to include a designated buffer stage for each data service, thereby reducing or eliminating the data transmission bottleneck. The performance of the stream processing pipeline can thus be further improved.

Figure 1A:
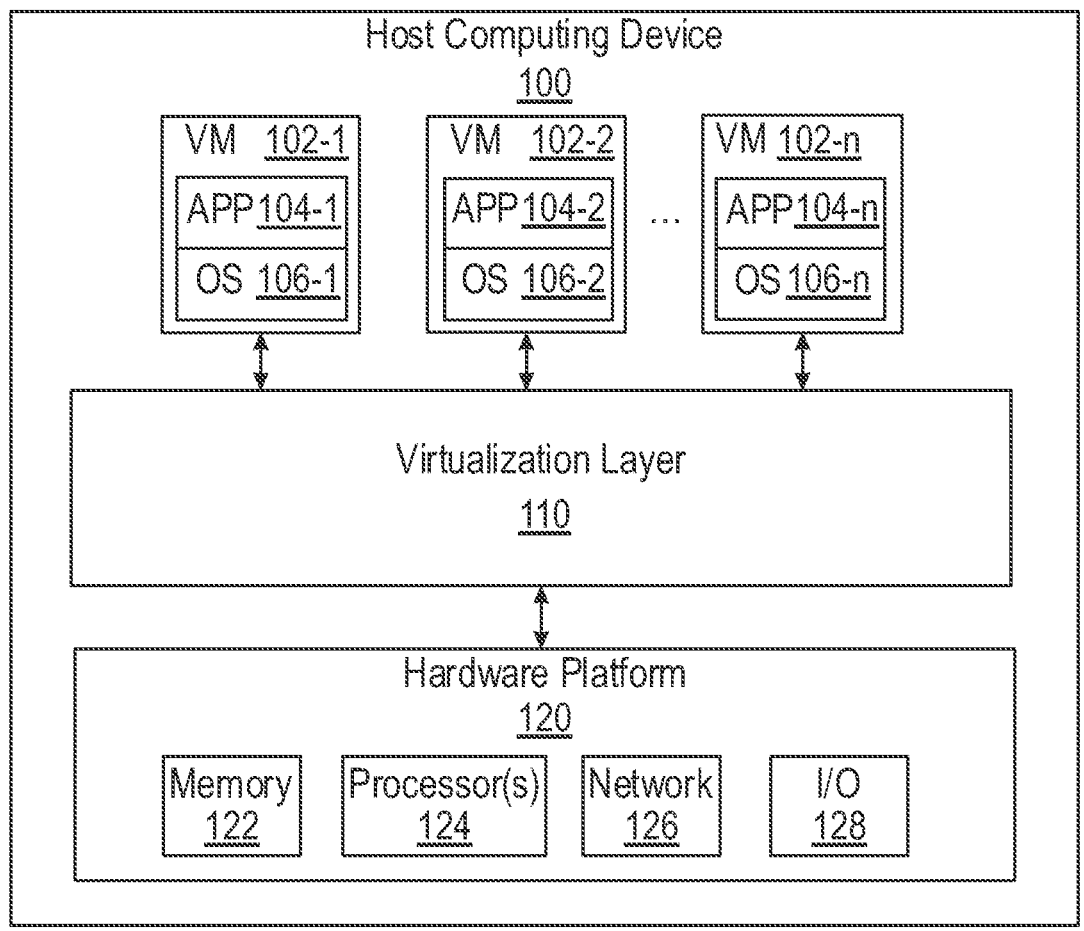
FIG. 1A is a block diagram illustrating a system and environment for implementing various components of a distributed-computing system, in accordance with some embodiments.

FIG. 1A is a block diagram illustrating a system and environment for implementing various components of a distributed-computing system, according to some embodiments. As shown, virtual machines (VMs) $102_1$, $102_2$ ... $120_n$ are instantiated on host computing device 100. In some embodiments, host computing device 100 implements one or more elements of a distributed-computing system (e.g., distributed-computing system 200, described below with reference to FIG. 2). Hardware platform 120 includes memory 122, one or more processors 124, network interface 126, and various I/O devices 128. Memory 122 includes computer-readable storage medium. The computer-readable storage medium is, for example, tangible and non-transitory. For example, memory 122 includes high-speed random access memory and also includes non-volatile memory, such as one or more magnetic disk storage devices, flash memory devices, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and many other components.

Virtualization layer 110 is installed on top of hardware platform 120. Virtualization layer 110, also referred to as a hypervisor, is a software layer that provides an execution environment within which multiple VMs 102 are concurrently instantiated and executed. The execution environment of each VM 102 includes virtualized components analogous to those comprising hardware platform 120 (e.g. a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (i.e. programs containing software code) and the hardware resources used to execute or run applications. However, in this case the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

Figure 1B:
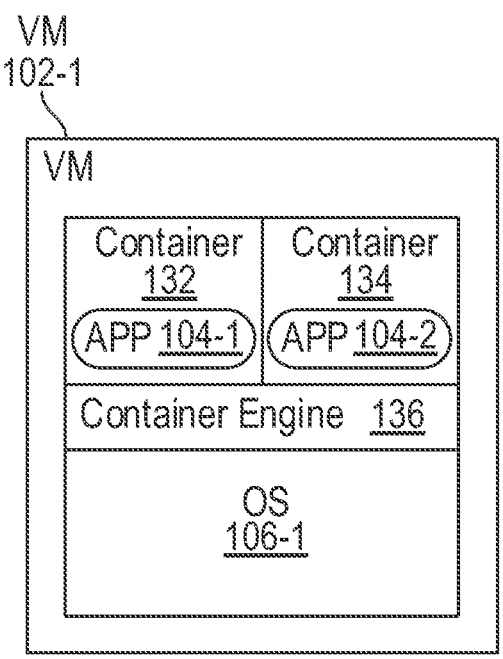
FIG. 1B is a block diagram illustrating a containerized application framework for implementing various components of a distributed-computing system, in accordance with some embodiments.

FIG. 1B is a block diagram illustrating a containerized application framework for implementing various components of a distributed-computing system, in accordance with some embodiments. More specifically, FIG. 1B illustrates VM $102_1$ implementing a containerized application framework. Containerization provides an additional level of abstraction for applications by packaging a runtime environment with each individual application. Container 132 includes App $104_1$ (i.e., application code), as well as all the dependencies, libraries, binaries, and configuration files needed to run App $104_1$. Container engine 136, similar to virtualization layer 110 discussed above, abstracts App $104_1$ from OS $106_1$, while enabling other applications (e.g., App $104_2$) to share operating system resources (e.g., the operating system kernel). As a result of this abstraction, each App 104 runs the same regardless of the environment (e.g., as though it has its own dedicated operating system).

It should be appreciated that applications (Apps) implementing aspects of the present disclosure are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed-computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2:
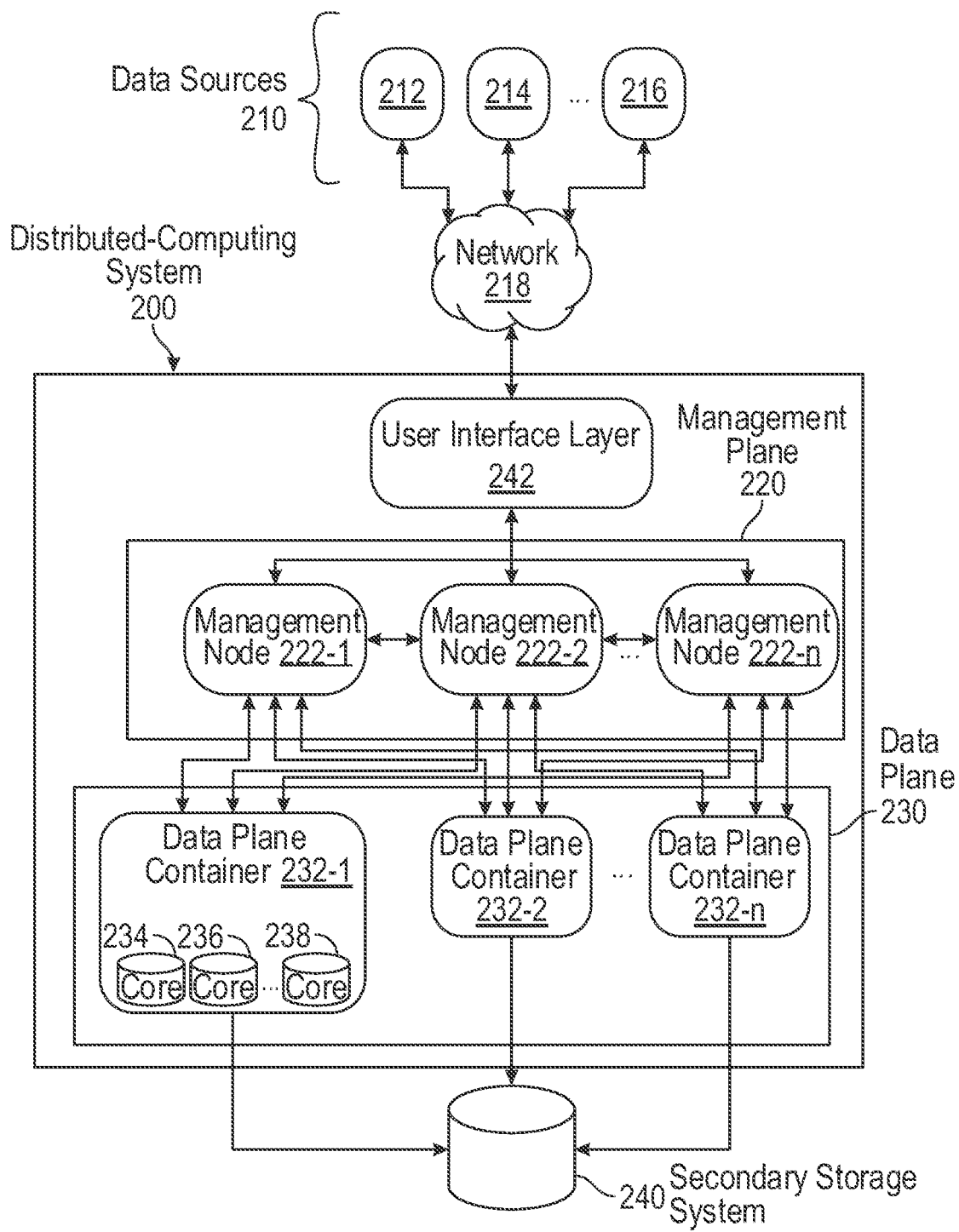
FIG. 2 illustrates systems and environment for searching and retrieving data stored in a distributed-computing system, in accordance with some embodiments.

FIG. 2 illustrates systems and environment for data ingestion by distributed-computing system 200, according to some embodiments. As shown, data sources 210 are coupled to distributed-computing system 200 through one or more communication networks 218. In particular, data sources 210 communicate with management plane 220 of distributed-computing system 200 via communication networks 218. In some embodiments, additional hardware and software components facilitate the transmission of data between data sources 210 and management plane 220. For example, data can pass through a proxy server, load balancer, or a data collector of a tenant system before arriving at management nodes 222 within management plane 220.

In some embodiments, data sources 210 include components which generate or provide data (e.g., log data) that is ingested into distributed-computing system 200. For example, data sources 210 include one or more information processing systems having servers 212, 214, and 216. Servers 212, 214, and 216 are located, for example, at one or more customer sites and generate data during operation. In some embodiments, one or more servers 212, 214, and 216 are referred to as tenant systems. In some implementations, a software agent (e.g., a data collector) running on one or more servers (e.g., servers 212, 214, and 216) collects data and facilitates its transmission via communications network 218 to management plane 220, where it is routed to a particular storage location within data plane 230. As part of this process, the agent sends an ingestion request to management plane 220 along with data it has collected from an associated data source 210 and receives a confirmation from management plane 220 upon successful ingestion.

Examples of communication network(s) 218 include local area networks (LAN) and wide area networks (WAN), e.g., the Internet. Communication network(s) 218 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. Further, it is appreciated that, in some embodiments, physical communication networks, such as described above, are also implemented as a software defined network (SDN) or through software emulation.

Distributed-computing system 200 includes management plane 220 and data plane 230. The terms "management plane" and "data plane" refer to functional descriptions of elements of distributed-computing system 200 that perform specialized functions. Management plane 220 implements all business and management logic which allow an administrator to configure distributed-computing system 200, including data plane functionality. For example, management plane 220 is configured to perform management functions, such as process user queries, persist user configurations, and execute operational tasks on management nodes 222 and data plane containers 232. Management plane 220 is also configured to, for example, perform tasks related to input validation, user management, policy management, and background task tracking. In some embodiments, management plane 220 implements packet switching, filtering, tagging, routing logic, and the like. In some embodiments, management plane 220 provides a single API entry point to distributed-computing system 200.

Management plane 220 includes one or more management nodes 222. Each management node 222 is an instantiation of management software (e.g., an application) which implements management functionality. Management node 222 runs on a dedicated physical host, as an application within a virtual machine, within a software container on a dedicated host, within a software container on a virtual machine, or any combination thereof. Each management node 222 is communicatively coupled to one another and to data plane 230 via a communication interface(s) such as those described with respect to communications network 218. In some embodiments, each of the plurality of management nodes 222 independently implement management functionality for data plane 230. This redundancy improves reliability. For example, in situations where a management node (e.g., 222$_1$) experiences a failure, another management node (e.g., 222$_2$) can takeover to maintain management functionality.

Data plane 230 is coupled to management plane 220. Data plane 230 is configured to perform data processing functionality. For example, data plane 230 is configured to index data during data ingestion and store the indexed data. In some embodiments, data plane 230 is configured to ingest data received from management plane 220 and query stored data. Data plane 230 includes a collection of data plane containers 232. Each data plane container is an instance of a software application implementing data processing functionality within a container (e.g., container 132). In some embodiments, data plane containers 232 run on a dedicated host or within a virtualized environment such as VM 102$_1$ on host computing device 100. Each data plane container 232 is associated with one or more data cores (e.g., cores 234, 236, and 238). A data core is an allocation of storage resources for files associated with a single tenant or customer. In some embodiments, a core spans one or more storage medias such as hard disks, solid state drives, virtual storage area network devices (VSANs), or the like. In some embodiments, each data core includes a database index with configuration, such as schema, caching, and the like. For example, each data core includes a set of memory structures that manages database files.

Data plane 230 is further coupled to secondary storage system 240 via communication interface(s), such as those described with respect to communications network 218. Data plane containers 232 communicate with secondary storage system 240 and are configured to transfer data to and retrieve data from secondary storage system 240. Secondary storage system 240 is configured to provide additional data storage functions such as backing up data located on data plane containers 232 or serving as long-term storage for infrequently accessed data. In some embodiments, secondary storage system 240 includes one or more storage media such as hard disks, solid state drives, virtual storage area network devices (VSANs), or the like.

Although in the present embodiment, distributed-computing system 200 includes management plane 220 and data plane 230, it should be recognized that, in other embodiments, distributed-computing system 200 can include additional functional layers. For example, distributed-computing system 200 can include additional software layers (e.g., applications) that facilitate functions related to providing alerts or notifications. In some embodiments, distributed-computing system 200 includes additional intermediate software layers for handling ingestion request or user queries.

Figure 3:
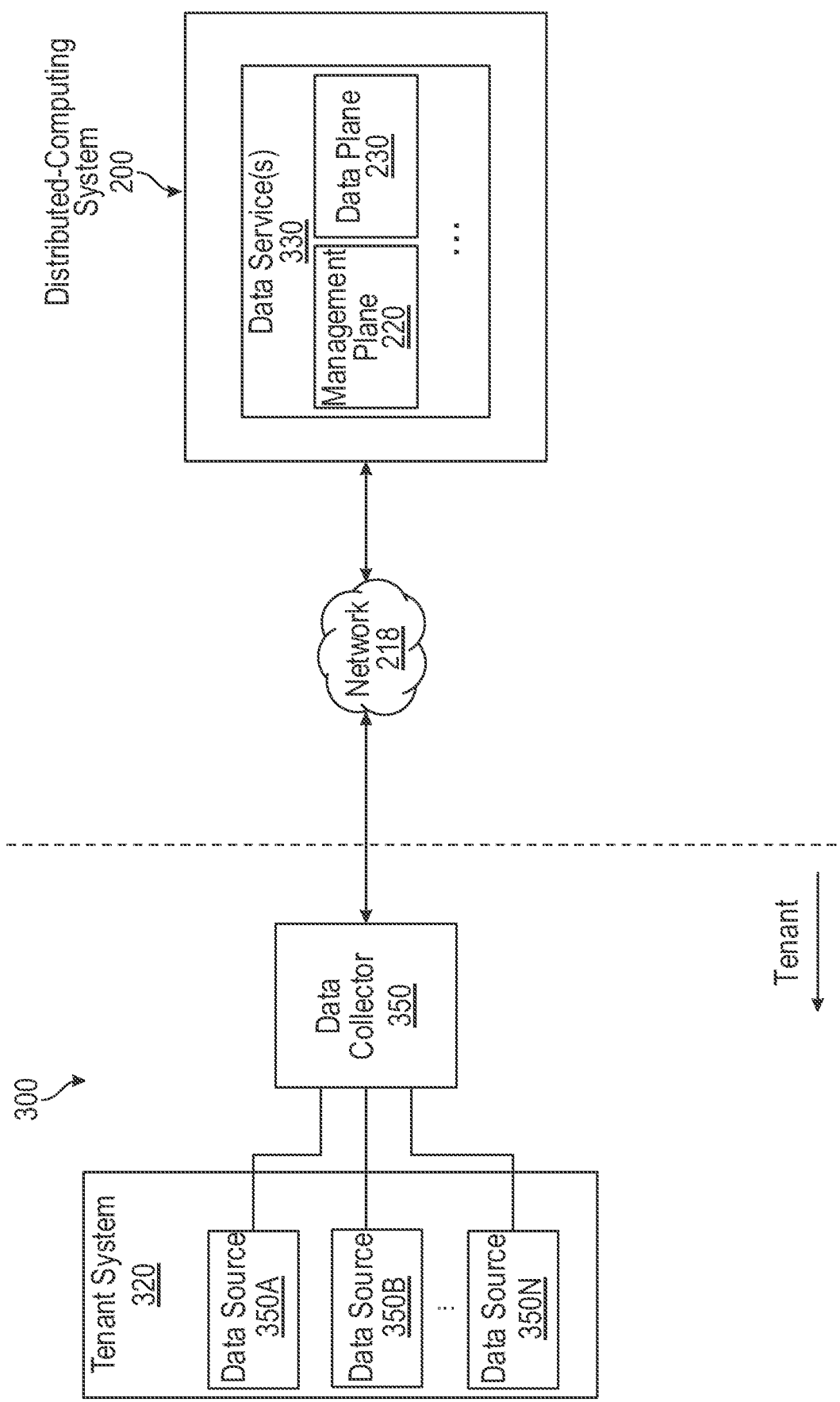
FIG. 3 is a block diagram illustrating systems and environment for collecting, aggregating, and ingesting data from multiple data sources associated with a tenant system to a distributed-computing system, in accordance with some embodiments.

FIG. 3 is a block diagram 300 illustrating systems and environment for collecting, aggregating, and ingesting data from multiple data sources associated with a tenant system 320 to a distributed-computing system 200, in accordance with some embodiments. As illustrated in FIG. 3, tenant system 320 can include or access one or more associated data sources 350A-N (collectively as 350). A tenant system can be a hardware, a software, or a combination thereof operating by or serving a tenant or customer. For example, a tenant system can include one or more servers 212, 214, 216 associated with a same tenant. In some embodiments, a tenant system can be provided with ability to customize at least one aspect of one or more software applications running on the tenant system. For example, a tenant system can be enabled to customize a user interface (e.g., color, appearance, functionality, etc.) of a user terminal 210 for communicating with distributed-computing system 200. In some embodiments, one or more data sources 350A-N can include applications that generate data (e.g., log data), databases that store the generated data, and/or hardware storages. Data sources 350 can be included in tenant system 320 (e.g., an application running on tenant system 320) or be an internal/external application/storage that is accessible to tenant system 320.

With reference to FIG. 3, tenant system 320 can be communicatively coupled to a data collector 350. A data collector 350 is a hardware, a software agent, or a combination thereof. Data collector 350 collects data from the data sources 350, processes the collected data, and transmits the processed data to one or more data services 330 of distributed-computing system 200. While FIG. 3 illustrates that data collector 350 collects data from a single tenant system 320, it should be recognized that data collector 350 can collect data from multiple tenant systems associated with a tenant or a customer. Each tenant or customer may also have more than one data collector 350 for collecting data.

In some embodiments, for collecting, processing, and transmitting data, data collector 350 can receive a configuration file (e.g., via network 218) from data service 330 of distributed-computing system 200. Data service 330 can be, for example, a cloud computing service that provides data storage, data retrieving, data searching, data analyzing, software-as-a-service (SaaS), or the like. In some embodiments, data service 330 can include one or more components of distributed-computing system 200. For example, data service 330 can include a management node 222 in a management plane 220 and a data plane container in a data plane 230. Data service 330 can thus includes a database platform configured to ingest data received from management plane 220 to a data core (e.g., data core 234) allocated for a particular tenant or customer.

Data generated at different tenants or customers may have different properties and/or quantities according to different business requirements of the tenants or customers. For example, applications operating on a tenant system of a first tenant may generate a large number of log data in a short period of time, while applications operating on a tenant system of a second tenant may generate less number of log data in the same period of time. As another example, log data generated by a tenant system of the first tenant may be of the same or similar type while log data generated by a tenant system of the second tenant may have many different types.

Accordingly, in some embodiments, data service 330 (e.g., via management plane 220) can analyze the data collected from a particular tenant system (e.g., tenant system 320) to determine the properties associated with the collected data (e.g., quantities, types, etc.). Based on the analysis results, a stream processing pipeline configuration file can be generated and transmitted to the tenant system. For example, as shown in FIG. 3, a configuration file for configuring one or more stream processing pipelines in data collector 350 can be generated and transmitted from data service 330 to data collector 350. A stream processing pipeline, as described in more detail below, can be used to collect data from data sources, process the collected data, store the processed or collected data, and/or transmit the processed data to a data service. In some embodiments, data collector 350 receives the configuration file, reads (e.g., via a bootstrap service) the configuration file, and implements a stream processing pipeline according to the configuration file. A configuration file can be, for example, a YAML-based configuration file. It should be recognized that the configuration file can also be based on any other mark-up languages that data collector 350 supports.

In some embodiments, a configuration file can include representations of a pipeline configuration of a stream processing pipeline. A pipeline configuration includes, for example, representations of a plurality of different types of pipeline stages configured based on respective customizations of a common entity. The entity can be a customizable object or abstraction of various types of pipeline stages. The entity can be associated with a first set of properties that are non-customizable (e.g., common) across different types of pipeline stages. A set of properties includes, for example, functionalities, mechanisms, parameters, protocols, ports, or the like, that are associated with a pipeline stage. For example, the first set of properties can include a description or definition that a pipeline stage, regardless of the type, must have one or more data receiving/transmitting mechanisms or terminals (e.g., an input terminal and an output terminal), for the purpose of interconnecting to preceding or following pipeline stages. The first set of properties can also include, for example, data types and/or data structures that a pipeline stage can process.

Figure 4:
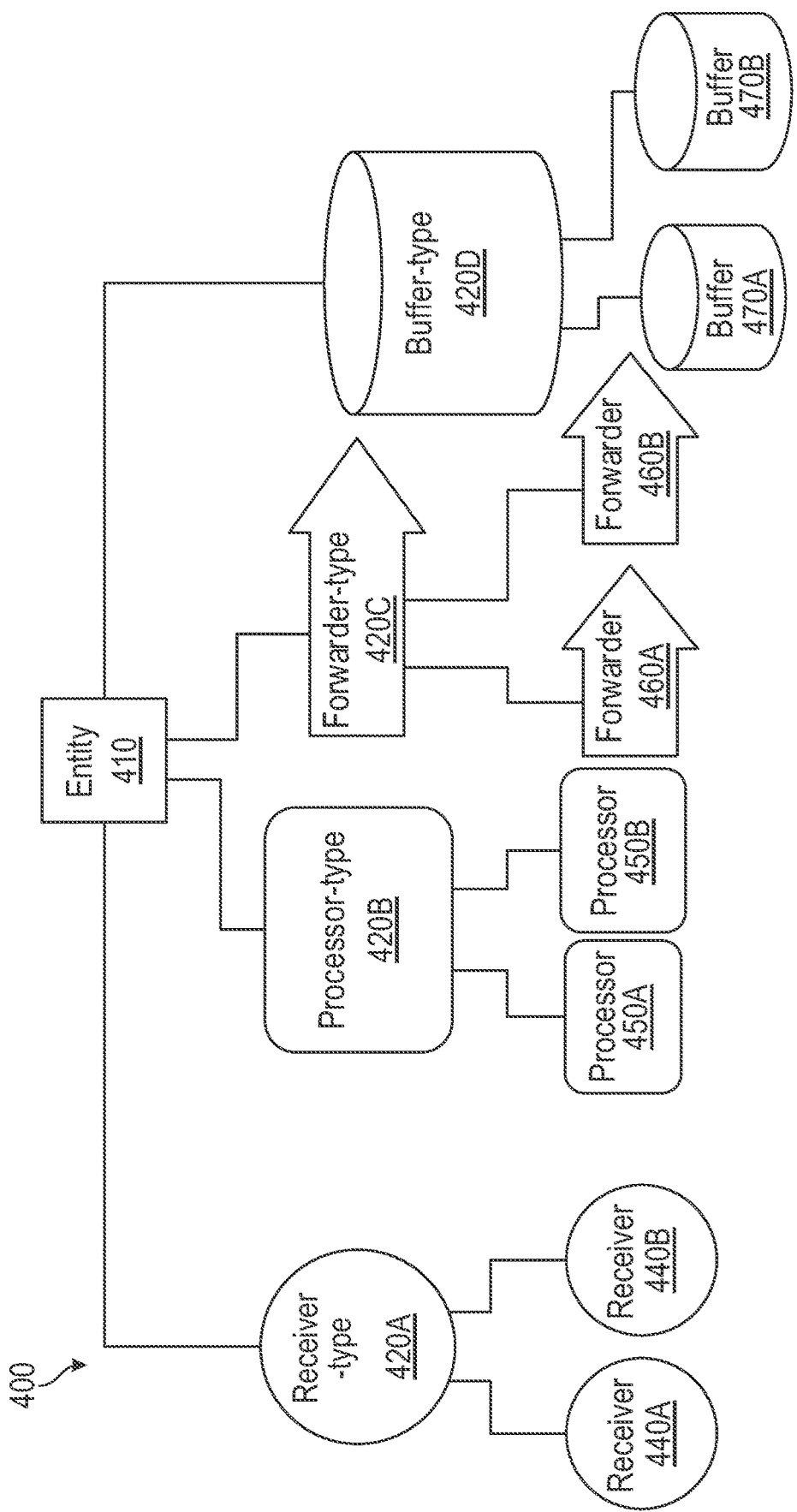
FIG. 4 illustrates exemplary customizations of an entity to generate one or more pipeline stages of a stream processing pipeline, in accordance with some embodiments.

The customizable entity can also be associated with a second set of properties that are customizable to generate different types of pipeline stages. FIG. 4 illustrates an example of customizing such an entity 410 to generate one or more pipeline stages of a stream processing pipeline. In FIG. 4, four types of pipeline stages are illustrated. As shown in FIG. 4, a first-type pipeline stage can be receiver-type stage 420A, which is generated based on a first type-specific customization of entity 410. The first type-specific customization includes defining, describing, adjusting, and/or configuring at least a portion of the second set of properties of entity 410 (e.g., functionalities) to generate receiver-type stage 420A. Receiver-type stage 420A can communicate and receive/collect data items (e.g., data packets) from one or more data sources (e.g., data sources 350).

As illustrated in FIG. 4, a second-type pipeline stage can be processor-type stage 420B, which is generated based on a second type-specific customization of entity 410. The second type-specific customization includes defining, describing, adjusting, and/or configuring at least a portion of the second set of properties of entity 410 (e.g., functionalities) to generate processor-type stage 420B. Processor-type stage 420B can process (e.g., extracting payloads, annotating payloads, categorizing payloads, or the like) data items provided by a receiver-type stage.

As illustrated in FIG. 4, a third-type pipeline stage can be forwarder-type stage 420C, which is generated based on a third type-specific customization of entity 410. The third type-specific customization includes defining, describing, adjusting, and/or configuring at least a portion of the second set of properties of entity 410 (e.g., functionalities) to generate forwarder-type stage 420C. Forwarder-type stage 420C can communicate and transmit processed data items to one or more data services (e.g., data service 330).

As illustrated in FIG. 4, a fourth-type pipeline stage can be buffer-type stage 420D, which is generated based on a fourth type-specific customization of entity 410. The fourth type-specific customization includes defining, describing, adjusting, and/or configuring at least a portion of the second set of properties of entity 410 (e.g., functionalities) to generate buffer-type stage 420D. Buffer-type stage 420D can store data items (processed or unprocessed) received from a preceding pipeline stage and provide the stored data items to the following pipeline stage.

As illustrated in FIG. 4, in some embodiments, the four different types of pipeline stages (420A-D) can be generated based on different type-specific customizations of the same entity 410. For example, the second type-specific customization (e.g., for generating processor-type stage 420B) can be different from the first and third type-specific customizations. In some embodiments, the four type-specific customizations are all different from each other. Type-specific customizations based on a common entity provides a high level of flexibility, as the same entity can be readily configured or customized to different types of pipeline stages using the second set of properties (e.g., the customizable properties). This is a result of the entity being a higher level of abstraction of the different pipeline stages. Thus, the entity can serve as a universal customizable template for generating different types of pipeline stages.

With reference to FIG. 4, in some embodiments, the four different types of pipeline stages (420A-D) can be further customized to generate particular instances of pipeline stages. In some embodiments, instance-specific customizations can be performed in furtherance to the type-specific customizations. As illustrated in FIG. 4, receiver-type stage 420A can be further customized to generate one or more particular instances of receiver stages including, for example, receiver stages 440A and 440B. Receiver stages 440A and 440B can have one or more common properties because they are both generated based on customization of the same receiver-type stage 420A. Receiver stages 440A and 440B can also have one or more different properties that are specific to each individual instance of receiver stages. For example, receiver stage 440A can be generated based on a first receiver-specific customization of receiver-type stage 420A; and receiver stage 440B can be generated based on a second receiver-specific customization of receiver-type stage 420A. The first receiver-specific customization includes defining, describing, adjusting, and/or configuring at least a portion of the second set of properties of entity 410 (e.g., parameters, protocols) for generating receiver stage 440A. Similarly, second receiver-specific customization includes defining, describing, adjusting, and/or configuring at least a portion of the second set of properties of entity 410 (e.g., parameters, protocols) for generating receiver stage 440B. The second receiver-specific customization may be different from the first receiver-specific customization. For example, as a result of the different customization, receiver stage 440A communicates and receives data items using a CDP protocol while receiver stage 440B communicates and receives data items using TCP protocol. The receiver-specific customization thus represents a finer and more specific customization of entity 410 (e.g., by further customizing the receiver-type stage 420A) to satisfy different streaming processing requirements.

Similarly, as illustrated in FIG. 4, processor-type stage 420B can be further customized to generate one or more particular instances of processor stages including, for example, processor stages 450A and 450B. Processor stages 450A and 450B can have one or more common properties because they may be both customized based on the same processor-type stage 420B. Processor stages 450A and 450B can also have one or more different properties that are specific to each individual instance of processor stages. For example, processor stage 450A can be generated based on a first processor-specific customization of processor-type stage 420B; and processor stage 450B can be generated based on a second processor-specific customization of processor-type stage 420B. The first processor-specific customization includes defining, describing, adjusting, and/or configuring at least a portion of the second set of properties of entity 410 (e.g., parameters, mechanisms, ports) for generating processor stage 450A. Similarly, second processor-specific customization includes defining, describing, adjusting, and/or configuring at least a portion of the second set of properties of entity 410 (e.g., parameters, mechanisms, ports) for generating processor stage 450B. The second processor-specific customization may be different from the first processor-specific customization. For example, based on different customizations, processor stage 450A may perform annotation of data items, while processor stage 450B may perform categorization of data items. The processor-specific customization thus represents a finer and more specific customization of entity 410 (e.g., by further customizing the processor-type stage 420B) to satisfy different streaming processing requirements.

Similarly, as illustrated in FIG. 4, forwarder-type stage 420C can be further customized to generate one or more particular instances of forwarder stages including, for example, forwarder stages 460A and 460B. Forwarder stages 460A and 460B can have one or more common properties because they may be both customized based on the same forwarder-type stage 420C. Forwarder stages 460A and 460B can also have one or more different properties that are specific to each individual instance of the forwarder stages. For example, forwarder stage 460A can be generated based on a first forwarder-specific customization of forwarder-type stage 420C; and forwarder 460B can be generated based on a second forwarder-specific customization of forwarder-type stage 420C. The first forwarder-specific customization includes defining, describing, adjusting, and/or configuring at least a portion of the second set of properties of entity 410 (e.g., parameters, protocols) to generate forwarder stage 460A. Similarly, second forwarder-specific customization includes defining, describing, adjusting, and/or configuring at least a portion of the second set of properties of entity 410 (e.g., parameters, mechanisms, ports) to generate forwarder stage 460B. The second forwarder-specific customization may be different from the first forwarder-specific customization. For example, based on different customizations, forwarder stage 460A communicates and transmits data items using a CDP protocol, while forwarder stage 460B communicates and receives data items using TCP protocol. The forwarder-specific customization thus represents a finer and more specific customization of entity 410 (e.g., by further customizing forwarder-type stage 420C) to satisfy different streaming processing requirements.

Similarly, as illustrated in FIG. 4, buffer-type stage 420D can be further customized to generate one or more particular instances of buffer stages including, for example, buffer stages 470A and 470B. Buffer stages 470A and 470B can have one or more common properties because they may be both customized based on the same buffer-type stage 420D. Buffer stages 470A and 470B can also have one or more different properties that are specific to each individual instance of buffer stages. For example, buffer stage 470A can be generated based on a first buffer-specific customization of buffer-type stage 420D; and buffer 470B can be generated based on a second buffer-specific customization of buffer-type stage 420D. The first buffer-specific customization includes defining, describing, adjusting, and/or configuring at least a portion of the second set of properties of entity 410 (e.g., parameters such as capacity or type of buffers) to generate buffer stage 470A. Similarly, second buffer-specific customization includes defining, describing, adjusting, and/ or configuring at least a portion of the second set of properties of entity 410 (e.g., parameters such as capacity or type of buffers) to generate buffer stage 470B. The second buffer-specific customization may be different from the first buffer-specific customization. For example, based on the different customization, buffer stage 470A may be a disk buffer with a large capacity; while buffer stage 470B may be a memory buffer with a smaller capacity. The buffer-specific customization thus represents a finer and more specific customization of entity 410 (e.g., by further customizing buffer-type stage 420D) to satisfy different streaming processing requirements.

As described above, a configuration file can include representations of a pipeline configuration of a stream processing pipeline. The pipeline configuration can thus include representations of the pipeline stages (e.g., each customized individual instance of the pipeline stages) of the stream processing pipeline to-be-implemented at a data collector. In some embodiments, the pipeline configuration can further include a representation of a structure for interconnecting pipeline stages. FIGS. 5A-5D illustrate various examples of structures for interconnecting a plurality of pipeline stages.

FIG. 5A is a block diagram illustrating an exemplary stream processing pipeline 500 customized to have a serial interconnection of one or more pipeline stages, in accordance with some embodiments. As illustrated in FIG. 5A, stream processing pipeline 500 can include a pipeline stage of a first-type (e.g., receiver stage 510), one or more pipeline stages of a second-type (e.g., processor stages 512A-C), and a pipeline stage of a third-type (e.g., forwarder stage 514). In some embodiments, two or more pipeline stages of the second-type in a stream processing pipeline can have a serial interconnection. For example, as shown in FIG. 5A, processor stage 512A-C are interconnected serially such that the processed data items from one processor stage is provided to the following processor stage for further processing. In the embodiment shown in FIG. 5A, receiver stage 510 receives or collects data items (e.g., log data) from one or more data sources and provides the received/collected data items to the serially-interconnected processor stages 512A-C. The processors stages 512A-C process the data items (e.g., annotating data items, categorizing data items, etc.) and provide the processed data items to forwarder stage 514, which transmits the processed data items to one or more data services.

Figure 5B:
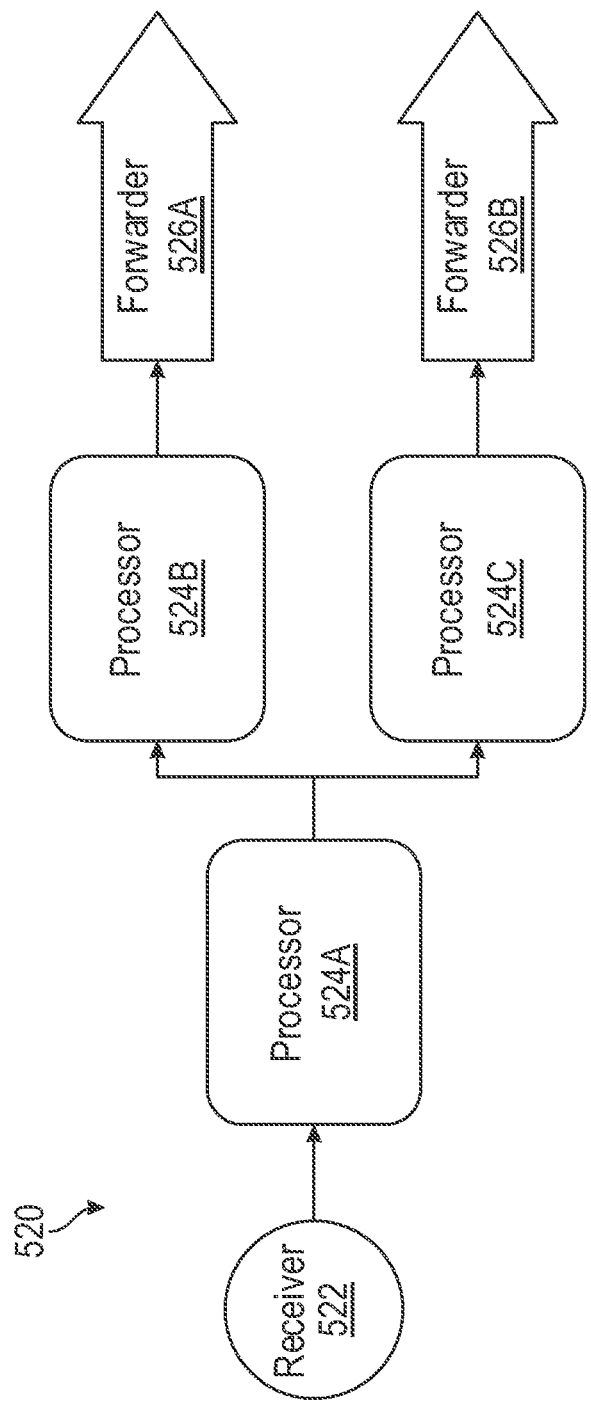
FIG. 5B is a block diagram illustrating an exemplary stream processing pipeline customized to have a parallel interconnection of one or more pipeline stages, in accordance with some embodiments.

FIG. 5B is a block diagram illustrating an exemplary stream processing pipeline 520 customized to have a parallel interconnection of one or more pipeline stages, in accordance with some embodiments. As illustrated in FIG. 5B and similar to stream processing pipeline 500, stream processing pipeline 520 can include a pipeline stage of a first-type (e.g., receiver stage 522), one or more pipeline stages of a second-type (e.g., processor stages 524A-C), and one or more pipeline stages of a third-type (e.g., forwarder stages 526A-B). In some embodiments, two or more pipeline stages of the second-type in a stream processing pipeline can have a parallel interconnection. For example, as shown in FIG. 5B, processor stage 524B and 524C are interconnected in parallel such that they both receive data items from a common preceding pipeline stage (e.g., the processed data item from processor stage 524A). In the embodiment shown in FIG. 5B, receiver stage 522 receives or collects data items (e.g., log data) from one or more data sources and provides the received/collected data items to processor stage 524A, which processes the data items (e.g., extract the payloads) and provides the processed data items to both processor stage 524B and 524C. In some embodiments, processor stage 524B and 524C can process the received data items differently based on their respective customizations. For example, processor stage 524B may annotate data items for transmitting to a first data service; and processor stage 524C may annotate data items for transmitting to a second data service. After processing the data items, processor stages 524B and 524C can provide the processed data items to, for example, a respective forwarder stage (e.g., forwarder stages 526A and 526B), which transmits the processed data items to a respective data service.

FIGS. 5C-5D are block diagrams illustrating exemplary stream processing pipelines 540A-B customized to have a buffer stage following a receiver stage, in accordance with some embodiments. As illustrated in FIG. 5C, in some embodiments, stream processing pipeline 540A can include a pipeline stage of a first-type (e.g., receiver stage 542), a pipeline stage of a second-type (e.g., processor stage 546A), and a pipeline stage of a fourth-type (e.g., buffer stage 544). In some embodiments, the pipeline stage of the fourth-type can be positioned between the pipeline stage of the first-type and the pipeline stage of the second-type. For example, as shown in FIG. 5C, a first terminal of buffer stage 544 is configured to be interconnected with receiver stage 542 and a second terminal of buffer stage 544 is configured to be interconnected with processor stage 546A. Buffer stage 544 is capable of buffering the collected data items before the processing of the collected data items. For example, in any given period of time, the rate that receiver stage 542 receives data items from one or more data sources may be greater than the rate processor stage 546A is capable of processing the received data items (e.g., during data spikes). In some embodiments, buffer stage 544 can store the received data items and provide the stored data items to processor stage 546A when the data items can be processed. Using a buffer stage can thus reduce or eliminate the likelihood that data items are lost or dropped due to data spikes. Including a buffer stage can thus improve the performance of the stream processing pipeline.

It should be recognized that processor stage 546A can be followed by any number of pipeline stages in any configurations. FIG. 5D illustrates such a stream processing pipeline 540B, where processor stage 546A are followed by two processor stages 546B-C interconnected in parallel with their respective forwarder stages 548A-B. The structure of stream processing pipeline 540B is thus similar to that of stream processing pipeline 520 shown in FIG. 5B, except stream processing pipeline 540B includes a buffer stage 514 positioned between receiver stage 542 and the first processor stage 546A.

Figure 5E:
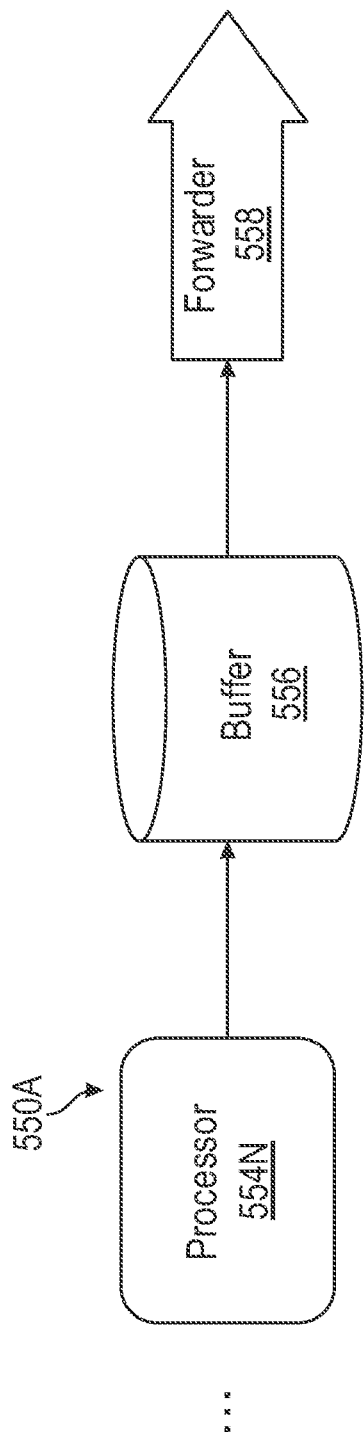
FIGS. 5E-5F are block diagrams illustrating exemplary stream processing pipelines customized to have a buffer stage preceding a forwarder stage, in accordance with some embodiments.
Figure 5F:
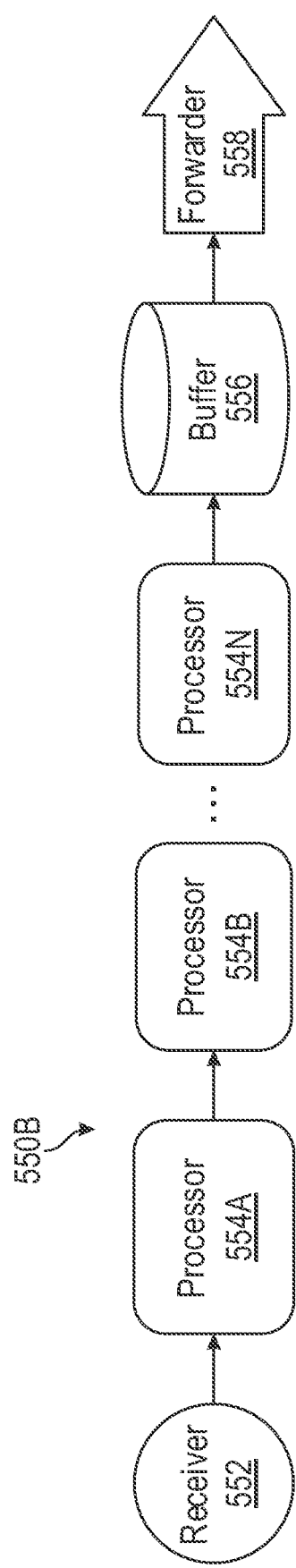

FIGS. 5E-5F are block diagrams illustrating exemplary stream processing pipelines 550A-B customized to have a buffer stage preceding a forwarder stage, in accordance with some embodiments. As illustrated in FIG. 5E, in some embodiments, stream processing pipeline 550A can include a pipeline stage of a second-type (e.g., processor stage 554N), a pipeline stage of a third-type (e.g., forwarder stage 558), and a pipeline stage of a fourth-type (e.g., buffer stage 556). In some embodiments, the pipeline stage of the fourth-type can be positioned between a pipeline stage of the second-type and a pipeline stage of the third-type. For example, as shown in FIG. 5E, a first terminal of buffer stage 556 is configured to be interconnected with processor stage 554N and a second terminal of buffer stage 556 is configured to be interconnected with forwarder stage 558. Buffer stage 556 is capable of buffering the processed data items before the transmitting of the processed data items to one or more data services by forwarder stage 558. For example, in any given period of time, the rate that forwarder stage 558 is able to transmit processed data items to one or more data services may be less than the rate processor stage 554N processes the data items. This may occur, for example, due to bandwidth limitations. Accordingly, buffer stage 556 can store the data items processed by processor stage 554N and provide the stored data items to forwarder stage 558 when the data items can be transmitted. Using a buffer stage can thus reduce or eliminate the likelihood that data items are lost or dropped due to bandwidth limitations. Including a buffer stage can thus improve the performance of the stream processing pipeline.

It should be recognized that processor stage 554N can be preceded by any number of pipeline stages in any configurations. FIG. 5F illustrates such a stream processing pipeline 550B, where processor stage 554N are preceded by two processor stages 554A-B interconnected serially. Processor stages 554A-B can also be configured to received data items from receiver stage 552. The structure of stream processing pipeline 550B is thus similar to that of stream processing pipeline 500 shown in FIG. 5A, except stream processing pipeline 550B includes a buffer stage 556 positioned between the last processor stage 554N and the forwarder stage 558.

As described above in FIGS. 5E-5F, exemplary stream processing pipelines 550A-B include a buffer stage 556 followed by a forwarder 558. Forwarder 558 can transmit processed data items stored in buffer stage 556 to one or more data services. In some embodiments, the communication links between a plurality of data services and forwarder 558 may have different bandwidths. For example, a first communication link between forwarder 558 and a first data service may have a first bandwidth such that data items can be transmitted to the first data service at a first rate; while a second communication link between forwarder 558 and a second data service may have a second bandwidth such that data items can be transmitted to the second data service at a second rate. The first bandwidth may be higher than the second bandwidth, and therefore the first rate of data transmission may be higher than the second rate of data transmission. As a result, the second communication link is slower than the first communication link. The slow communication link may become the transmission bottleneck because data items to-be-transmitted are all stored in a single buffer stage 556. For example, buffer stage 556 shown in FIGS. 5E-5F may store processed data items A, B, and C. Forwarder stage 558 may begin transmission of the data items by forwarding data item A to the first and second data services. Because the second data service has a lower bandwidth than the first data service, it receives data items in a slower rate than the first data service. Thus, after forwarder stage 558 transmits data item A to the first data service, it cannot transmit data item B to the first data service until after it can transmit data item A to the second data service. This may limit the transmission rate for the first data service despite that the first data service has the capability to communicate at a higher data rate. The stream processing pipelines 550A-B can be further improved to reduce or eliminate the bottleneck issue by using a designated buffer stage for each data service.

Figure 6A:
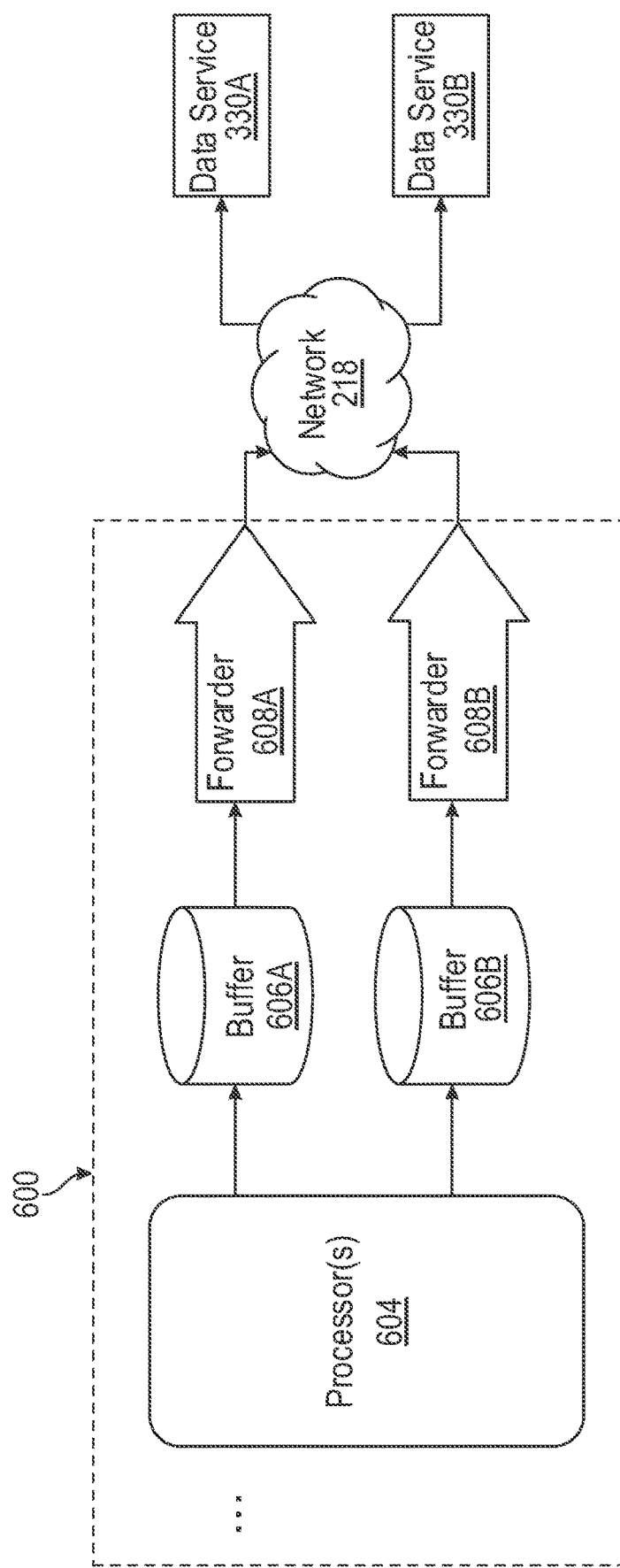
FIGS. 6A-6C are block diagrams illustrating exemplary stream processing pipelines customized to have a designated buffer stage for each data service, in accordance with some embodiments.
Figure 6B:
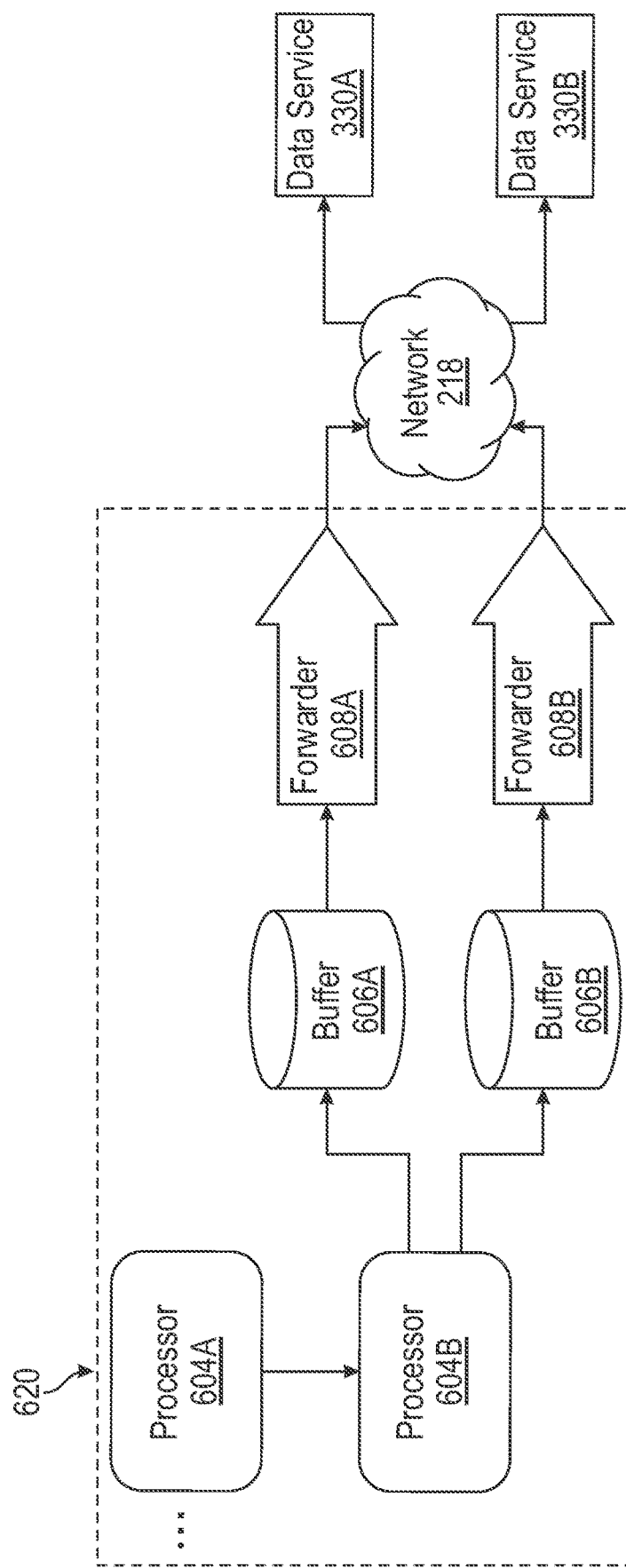
Figure 6C:
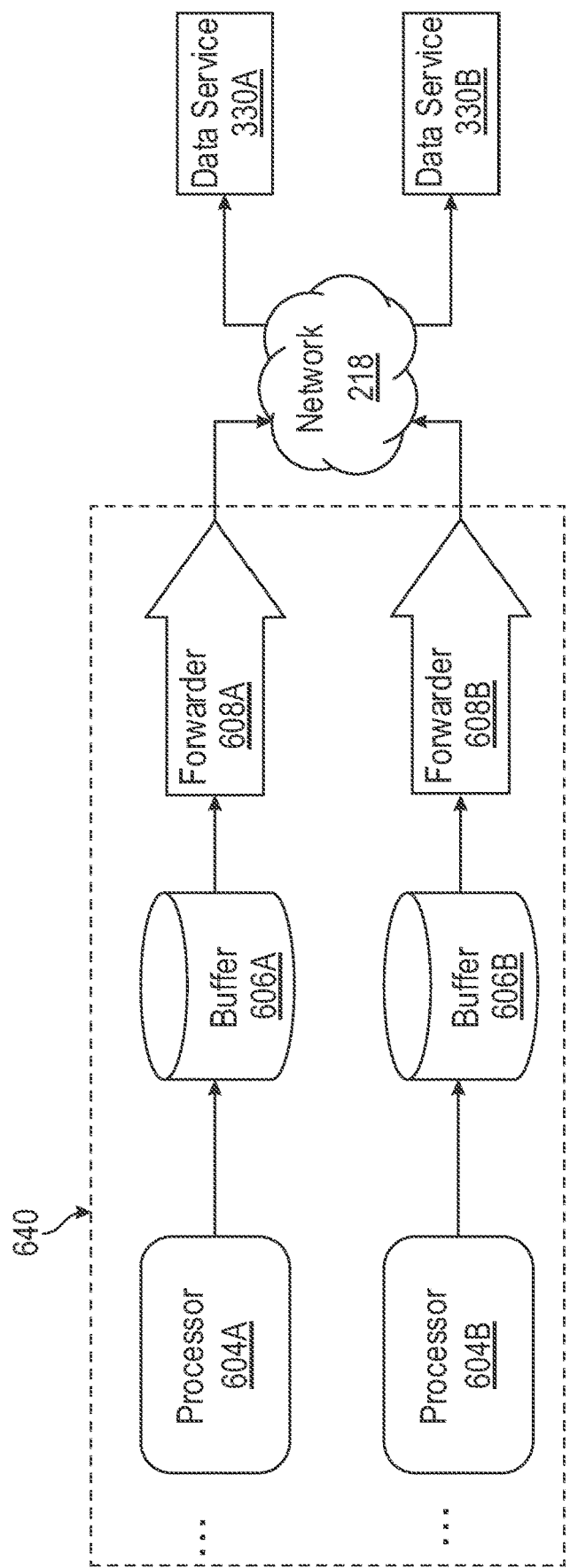

FIGS. 6A-6C are block diagrams illustrating exemplary stream processing pipelines 600, 620, and 640 customized to have a designated buffer stage for each data service, in accordance with some embodiments. As illustrated in FIG. 6A, in some embodiments, stream processing pipeline 600 can include one or more pipeline stages of a second-type (e.g., one or more processor stages 604), one or more pipeline stages of a fourth-type (e.g., buffer stages 606A-B), and one or more pipeline stages of a third-type (e.g., forwarder stage 608A-B). In some embodiments, each of the pipeline stages of the fourth-type can be positioned in front of a respective pipeline stage of the third-type. For example, as shown in FIG. 6A, a first terminal of buffer stage 606A is configured to be interconnected with one or more processor stages 604; and a second terminal of buffer stage 606A is configured to be interconnected with forwarder stage 608A. Similarly, a first terminal of buffer stage 608A is configured to be interconnected with one or more processor stages 604; and a second terminal of buffer stage 606B is configured to be interconnected with forwarder stage 608B. Thus, each buffer stage 606A-B is interconnected with its respective forwarder stage 608A-B. As a result, data items stored in buffer stage 606A can be transmitted by forwarder stage 608A to data service 330A; and data items stored in buffer stage 606B can be transmitted by forwarder stage 608B to data service 330B. The data transmissions to data services 330A and 330B can therefore be independent from each other. For instance, the transmission rate for transmitting data items to data service 330A can be different from (e.g., greater than) the transmission rate for transmitting data items to data service 330B. As a result, the performance of stream processing pipeline 600 can be improved by de-coupling the transmission to different data services by using a designated buffer stage for each data service. In some embodiments, the transmission rate for transmitting data items to a particular data service corresponds to a maximum rate that the data service is capable of accepting data.

In some embodiments, buffer stage 606A can be customized to have different properties (e.g., storage capacity and/or type) from buffer stage 606B. For example, based on the analysis of the history of data transmission between a particular tenant system and data services 330A-B, it may be determined that data service 330A is capable of receiving data items at a higher rate than data service 330B. As a result, buffer stage 606A can be configured to have a smaller capacity than buffer stage 606B.

With reference to FIG. 6A, in some embodiments, the processed data items stored in buffer stage 606A include a duplicate of at least one processed data item that is stored in buffer stage 606B. For example, certain data items (e.g., log data) may be common and are transmitted to both data services 330A and 330B. Accordingly, duplicates of these data items can be stored in both buffer stages 606A and 606B. Buffer stage 606A can also store data items that are specific to data service 330A; and buffer stage 606B can also store data items that are specific to data service 330B.

FIG. 6B illustrates a specific configuration of a stream processing pipeline 620 customized based on the configuration shown in FIG. 6A. As shown in FIG. 6B, stream processing pipeline 620 includes similar buffer stages 606A-B and forwarder stages 608A-B interconnected in a similar manner as those shown in FIG. 6A. As also illustrated in FIG. 6B, in stream processing pipeline 620, processors stages 604A and 604B can be configured to interconnect in a serial manner, followed by a parallel interconnection of buffer stages 606A-B. Accordingly, a first terminal of buffer stage 606A and a first terminal of buffer stage 606B are both configured to be interconnected with processor stage 604B, which is preceded by processor stage 604A. Processor stage 604A can be interconnected to other pipeline stages (e.g., another processor stage or a receiver stage). As a result of this configuration, the same processed data items are stored in both buffer stages 606A and 606B, and are transmitted to data services 330A and 330B, respectively.

FIG. 6C illustrates another specific configuration of a stream processing pipeline 640 customized based on the configuration shown in FIG. 6A. As shown in FIG. 6C, stream processing pipeline 640 includes similar buffer stages 606A-B and forwarder stages 608A-B interconnected in a similar manner as those shown in FIG. 6A. As also illustrated in FIG. 6C, in stream processing pipeline 640, processors stages 604A and 604B can be configured to interconnect in a parallel manner, followed by a parallel interconnection of buffer stages 606A-B, respectively. Accordingly, a first terminal of buffer stage 606A is configured to be interconnected with processor stage 604A; and a first terminal of buffer stage 606B is configured to be interconnected with processor stage 604B. Processor stages 604A-B can be interconnected to other pipeline stages (e.g., one or more other processor stages or one or more receiver stages). As a result of this configuration, buffer stages 606A and 606B store different data items provided by processor stages 604A and 604B, respectively. The data items stored in buffer stages 606A and 606B are transmitted to data services 330A and 330B, respectively.

Figure 7:
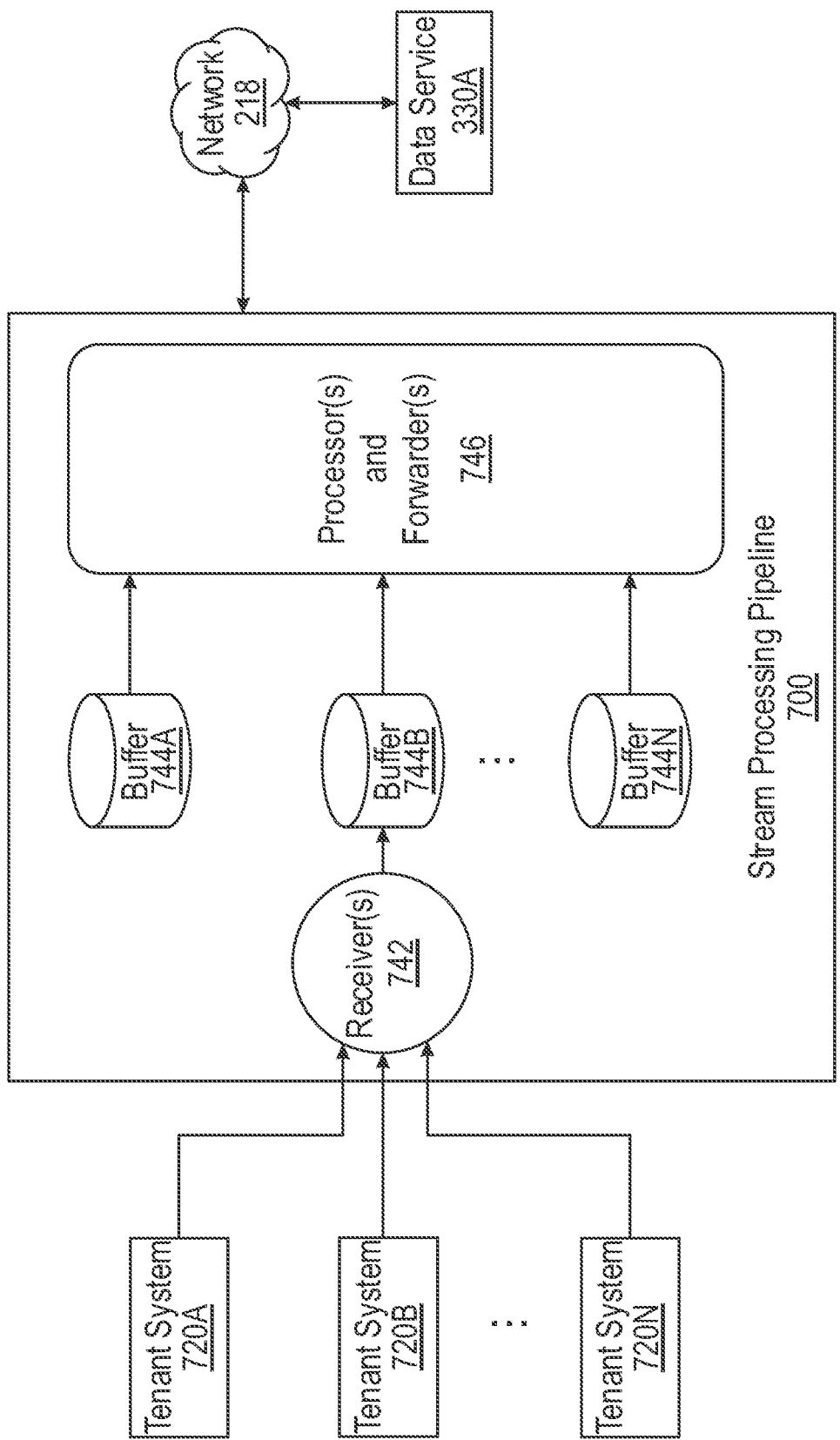
FIG. 7 is a block diagram illustrating an exemplary stream processing pipeline customized to have a designated buffer stage for each tenant system, in accordance with some embodiments.

FIG. 7 is a block diagram illustrating an exemplary stream processing pipeline 700 customized to have a designated buffer stage for each tenant system, in accordance with some embodiments. As described above, one or more receivers of a stream processing pipeline can collect data items (e.g., log data) from one or more tenant systems associated with a tenant or customer. Different tenant systems may have different data transmission rate. For example, as shown in FIG. 7, tenant system 720A may generate and/or transmit more data items in a given period of time than tenant system 720B, and thus may have a higher data transmission rate than tenant system 720B. As a result, one or more receiver stages 742 may collect data items from tenant system 720A at a higher data collecting rate than from tenant system 720B. If all the collected data items are stored in a single buffer, the single buffer may be overwhelmed with data items collected from tenant system 720A and thus data items collected from tenant system 720B may be lost or dropped. For example, the single buffer may have a limited capacity such that during a given period of time, it can only store data items collected from tenant system 720A and there is no capacity to store data items collected from tenant system 720B. Thus, if tenant system 720B transmits one or more data items to receiver 742 during that period of time, the data items may be lost or dropped.

With reference to FIG. 7, in some embodiments, different buffer stages 744A-N can be configured to store data items collected from respective tenant systems 720A-N. For example, buffer stage 744A stores data items collected from tenant system 720A; buffer stage 744B stores data items collected from tenant system 720B; and so forth. As a result of using independent buffer stages for different tenant systems, the impact of different data items generation and/or transmission rate can be reduced or eliminated. The using of independent buffer stages corresponding to different tenant system thus improves the system performance by reducing or eliminating the undesired loss of data items.

Figure 8A:
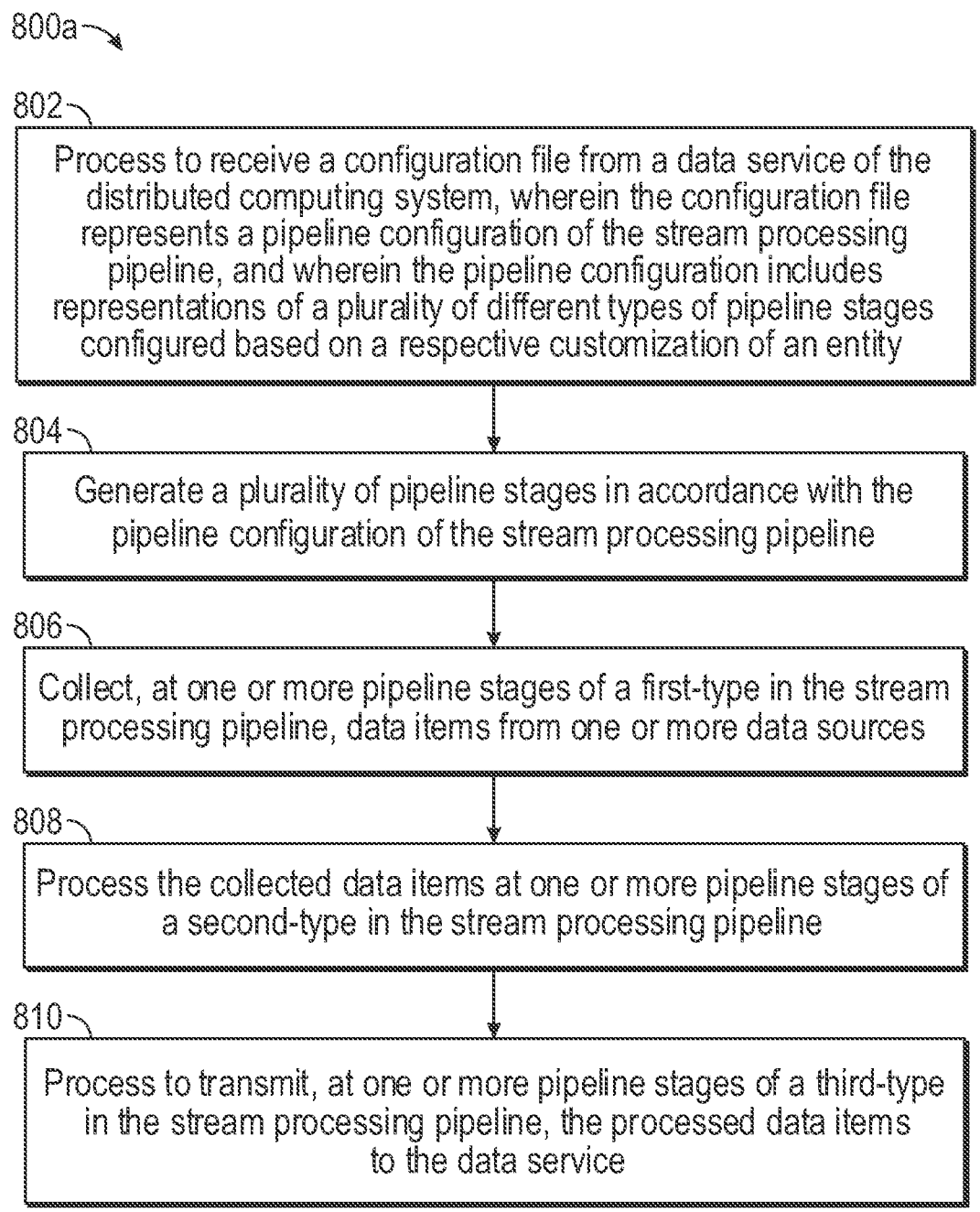
FIGS. 8A-8C illustrate flowcharts of exemplary processes for generating a stream processing pipeline, in accordance with some embodiments.
Figure 8B:
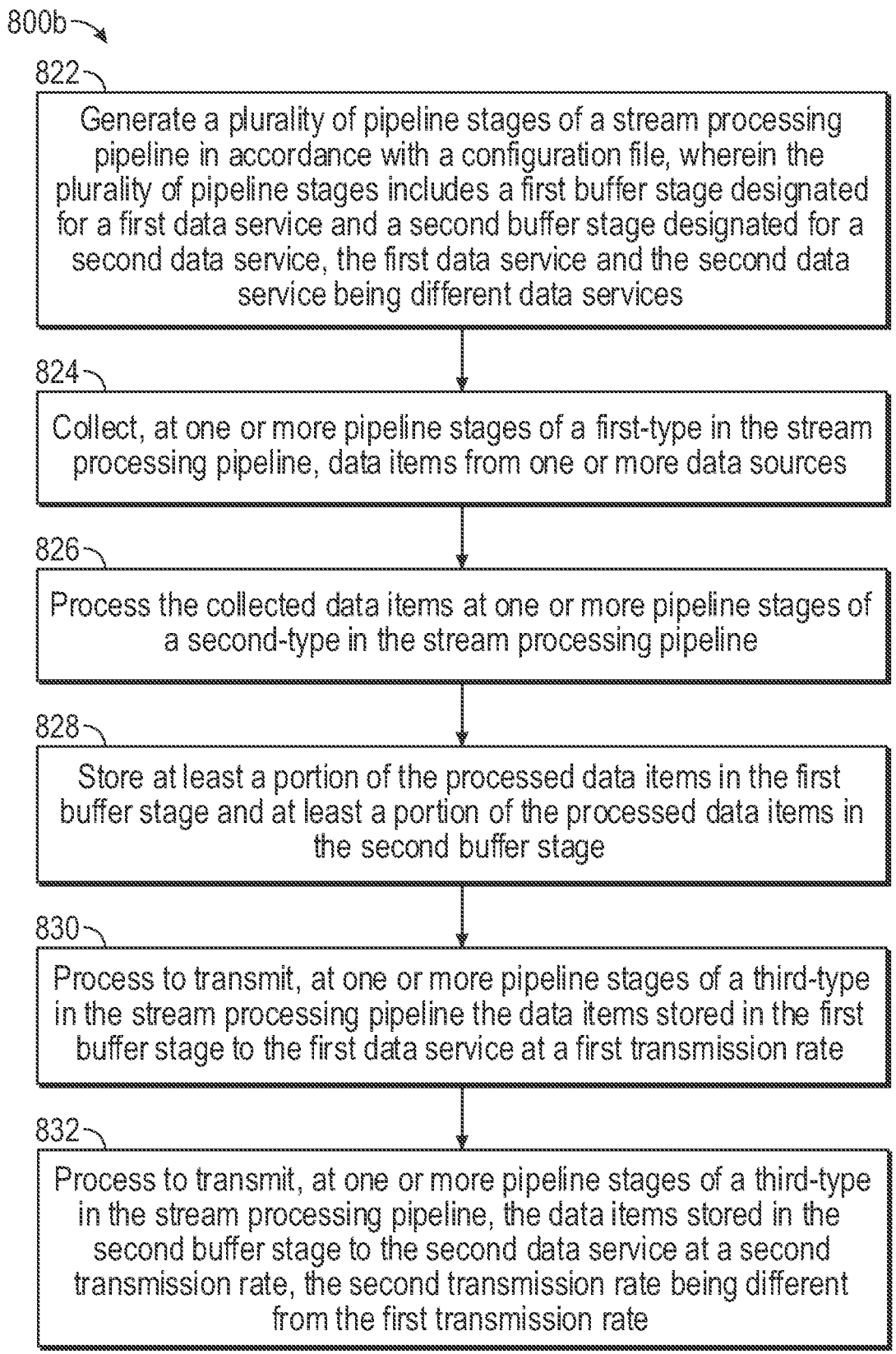
Figure 8C:
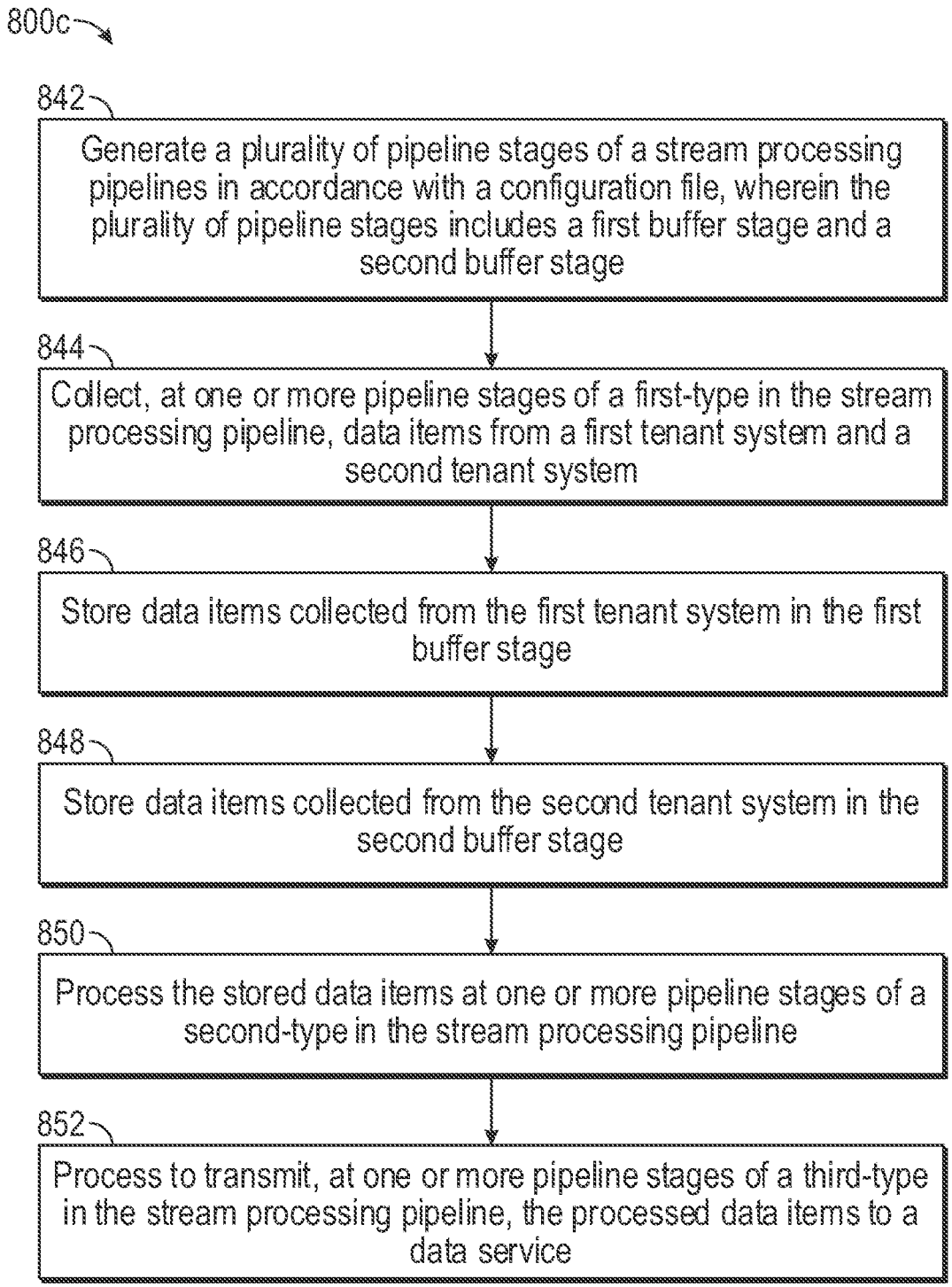

FIGS. 8A-8C illustrate flowcharts of exemplary processes 800a-c for generating a stream processing pipeline, in accordance with some embodiments. Processes 800a-c are performed, for example, using a data collector of a tenant system collecting data for ingesting to a distributed-computing system (e.g., distributed-computing system 200 described in reference to FIG. 2). In some embodiments, the distributed-computing system comprises a plurality of host computing devices (e.g., host computing device 100 described in reference to FIG. 1A) that are communicatively coupled together in a network. In some embodiments, the distributed-computing system is implemented by one or more virtual machines (e.g., VM 102 described in reference to FIGS. 1A-1B). The distributed-computing system implements, for example, a management plane (e.g., management plane 220) and a data plane (e.g., data plane 230). In some embodiments, the operations of processes 800a-c are distributed across the various components (e.g., management plane, data plane, etc.) of the distributed-computing system. In processes 800a-c, some blocks are, optionally, combined, the order of some blocks is, optionally, changed, and some blocks are, optionally, omitted. In some embodiments, additional operations may be performed in combination with processes 800a-c.

At block 802, a configuration file received from a data service of the distributed-computing system is processed. The configuration file represents a pipeline configuration of the stream processing pipeline, and the pipeline configuration includes representations of a plurality of different types of pipeline stages configured based on a respective customization of an entity.

At block 804, a plurality of pipeline stages is generated in accordance with the pipeline configuration of the stream processing pipeline.

At block 806, data items from one or more data sources are collected at one or more pipeline stages of a first-type in the stream processing pipeline.

At block 808, the collected data items are processed at one or more pipeline stages of a second-type in the stream processing pipeline.

At block 810, the processed data items are processed to be transmitted to the data service at one or more pipeline stages of a third-type in the stream processing pipeline.

FIG. 8B illustrates a flowchart of exemplary process 800b for transmitting of data items to a plurality of data services. Process 800b can be performed at a data collector associated with a tenant system collecting data for ingesting to a distributed-computing system.

At block 822, a plurality of pipeline stages of a stream processing pipeline is generated in accordance with a configuration file. The plurality of pipeline stages includes a first buffer stage designated for a first data service and a second buffer stage designated for a second data service. The first data service and the second data service are different data services.

At block 824, data items from one or more data sources are collected at one or more pipeline stages of a first-type in the stream processing pipeline.

At block 826, the collected data items are processed at one or more pipeline stages of a second-type in the stream processing pipeline.

At block 828, at least a portion of the processed data items is stored in the first buffer stage and at least a portion of the processed data items is stored in the second buffer stage.

At block 830, the data items stored in the first buffer stage are processed to be transmitted, at one or more pipeline stages of a third-type in the stream processing pipeline, to the first data service at a first transmission rate.

At block 832, the data items stored in the second buffer stage are processed to be transmitted, at one or more pipeline stages of a third-type in the stream processing pipeline, to the second data service at a second transmission rate. The second transmission rate is different from the first transmission rate.

FIG. 8C illustrates a flowchart of exemplary process 800c for collecting data items from a plurality of tenant systems. Process 800c can be performed at a data collector associated with a plurality of tenant systems collecting data for ingesting to a distributed-computing system.

At block 842, a plurality of pipeline stages of a stream processing pipelines is generated in accordance with a configuration file. The plurality of pipeline stages includes a first buffer stage and a second buffer stage.

At block 844, data items from a first tenant system and a second tenant system are collected at one or more pipeline stages of a first-type in the stream processing pipeline.

At block 846, data items collected from the first tenant system are stored in the first buffer stage.

At block 848, data items collected from the second tenant system are stored in the second buffer stage.

At block 850, the stored data items are processed at one or more pipeline stages of a second-type in the stream processing pipeline.

At block 852, the processed data items are transmitted to a data service at one or more pipeline stages of a third-type in the stream processing pipeline.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A non-transitory computer-readable storage medium storing one or more programs configured to be executed by one or more processors of a tenant system collecting data for ingesting to a distributed-computing system, the one or more programs including instructions for:
    generating a plurality of pipeline stages of a stream processing pipeline in accordance with a configuration file;
    collecting, at one or more pipeline stages of a first-type in the stream processing pipeline, data items from one or more data sources;
    processing a first subset of the collected data items at a first pipeline stage of a second-type in the stream processing pipeline and a second subset of the collected data items at a second pipeline stage of the second-type, wherein the second pipeline stage and the first pipeline stage operate in parallel;
    transmitting, at a third pipeline stage of a third-type in the stream processing pipeline, the data items processed by the first pipeline stage to a first data service; and
    transmitting, at a fourth pipeline stage of the third-type, the data items processed by the second pipeline stage to a second data service.

2. The non-transitory computer-readable storage medium of claim 1, wherein processing the first subset of the collected data items comprises annotating the first subset of the collected data items for transmission to the first data service.

3. The non-transitory computer-readable storage medium of claim 1, further comprising:
    receiving at a third pipeline stage of the second-type the data items from the one or more pipeline stages of the first-type;
    extracting payloads from the data items;
    transmitting extracted payloads from the first subset of the collected data items to the first pipeline stage; and
    transmitting extracted payloads from the second subset of the collected data items to the second pipeline stage.

4. The non-transitory computer-readable storage medium of claim 1, further comprising:
    storing at least a portion of the collected data items in a buffer stage when a rate at which the data items are received from the one or more data sources exceeds the rate at which the first and second pipeline stages process the collected data items.

5. The non-transitory computer-readable storage medium of claim 1, wherein the non-transitory computer-readable storage medium is configured to be executed by a data collector associated with a tenant system.

6. The non-transitory computer-readable storage medium of claim 1, further comprising:
    buffering the first and second subsets of the collected data prior to the data being processed by the first and second pipeline stages.

7. The non-transitory computer-readable storage medium of claim 1, wherein the first and second data services are both part of the distributed computing system.

8. The non-transitory computer-readable storage medium of claim 7, wherein the configuration file is generated by the distributed computing system.

9. The non-transitory computer-readable storage medium of claim 7, wherein the first service comprises a management plane and a data plane container of a data plane of the distributed computing system.

10. A method for transmitting of data items to a plurality of data services, the method comprising:
    at a data collector associated with a tenant system collecting data for ingesting to a distributed-computing system:
    generating a plurality of pipeline stages of a stream processing pipeline in accordance with a configuration file;
    collecting, at one or more pipeline stages of a first-type in the stream processing pipeline, data items from one or more data sources;
    processing a first subset of the collected data items at a first pipeline stage of a second-type in the stream processing pipeline and a second subset of the collected data items at a second pipeline stage of the second-type, wherein the second pipeline stage and the first pipeline stage operate in parallel;
    transmitting, at a third pipeline stage of a third-type in the stream processing pipeline, the data items processed by the first pipeline stage to a first data service; and
    transmitting, at a fourth pipeline stage of the third-type, the data items processed by the second pipeline stage to a second data service.

11. The method of claim 10, wherein processing the first subset of the collected data items comprises annotating the first subset of the collected data items for transmission to the first data service.

12. The method of claim 10, further comprising:
    receiving at a third pipeline stage of the second-type the data items from the one or more pipeline stages of the first-type;

extracting payloads from the data items;
transmitting extracted payloads from the first subset of the collected data items to the first pipeline stage; and
transmitting extracted payloads from the second subset of the collected data items to the second pipeline stage.

13. The method of claim 10, further comprising:
storing at least a portion of the collected data items in a buffer stage when a rate at which the data items are received from the one or more data sources exceeds the rate at which the first and second pipeline stages process the collected data items.

14. The method of claim 10, further comprising:
storing at least a portion of the collected data items in a buffer stage when a rate at which the data items are received from the one or more data sources exceeds the rate at which the first and second pipeline stages process the collected data items.

15. The method of claim 10, wherein the one or more data sources are a singular data source.

16. A system for transmitting data items to a plurality of data services of a distributed computing system, the system comprising:
one or more processors; and
memory storing one or more programs configured to be executed by the one or more processors, the one or more programs including instructions for:
generating a plurality of pipeline stages of a stream processing pipeline in accordance with a configuration file, wherein the plurality of pipeline stages includes a first buffer stage designated for a first data service and a second buffer stage designated for a second data service, the first data service and the second data service being different data services;
collecting, at one or more pipeline stages of a first-type in the stream processing pipeline, data items from one or more data sources;
processing the collected data items at one or more pipeline stages of a second-type in the stream processing pipeline;
storing at least a portion of the processed data items in the first buffer stage and at least a portion of the processed data items in the second buffer stage;
processing to transmit, at one or more pipeline stages of a third-type in the stream processing pipeline,
the data items stored in the first buffer stage to the first data service at a first transmission rate; and
the data items stored in the second buffer stage to the second data service at a second transmission rate, the second transmission rate being different from the first transmission rate.

17. The system of claim 16, wherein the configuration file represents a pipeline configuration of the stream processing pipeline, and wherein the pipeline configuration includes representations of a plurality of different types of pipeline stages configured based on a respective customization of an entity.

18. The system of claim 17, wherein the representations of the plurality of different types of pipeline stages comprise:
one or more representations of the one or more pipeline stages of the first-type customized based on a first type-specific customization of the entity;
one or more representations of one or more pipeline stages of the second-type customized based on a second type-specific customization of the entity; and
one or more representations of one or more pipeline stages of the third-type customized based on a third type-specific customization of the entity, wherein the second type-specific customization is different from the first and the third type-specific customizations.

19. The system of claim 16, wherein processing the first subset of the collected data items comprises annotating the first subset of the collected data items for transmission to the first data service.

20. The system of claim 16, wherein the programs include further instructions for:
receiving at a third pipeline stage of the second-type the data items from the one or more pipeline stages of the first-type;
extracting payloads from the data items;
transmitting extracted payloads from the first subset of the collected data items to the first pipeline stage; and
transmitting extracted payloads from the second subset of the collected data items to the second pipeline stage.

* * * * *